United States Patent
Jiang

(10) Patent No.: US 10,826,957 B2
(45) Date of Patent: *Nov. 3, 2020

(54) INSTANT COMMUNICATIONS SYSTEM HAVING ESTABLISHED COMMUNICATION CHANNELS BETWEEN COMMUNICATION DEVICES

(71) Applicant: Hong Jiang, Westfield, NJ (US)

(72) Inventor: Hong Jiang, Westfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,489

(22) Filed: May 20, 2019

(65) Prior Publication Data
US 2019/0306213 A1 Oct. 3, 2019

Related U.S. Application Data

(63) Continuation of application No. 14/954,693, filed on Nov. 30, 2015, now Pat. No. 10,298,644, which is a
(Continued)

(51) Int. Cl.
*H04M 7/14* (2006.01)
*H04L 29/06* (2006.01)
(Continued)

(52) U.S. Cl.
CPC ...... *H04L 65/4092* (2013.01); *G06F 3/04847* (2013.01); *H04L 65/1073* (2013.01);
(Continued)

(58) Field of Classification Search
CPC ..... H04B 7/155; H04L 65/1006; H04L 67/14; H04L 35/4061; H04M 2203/2044;
(Continued)

(56) References Cited

U.S. PATENT DOCUMENTS 6,937,712 B2  8/2005 Lemchen et al.
7,103,392 B2  9/2006 Fletcher et al.
(Continued)

FOREIGN PATENT DOCUMENTS

CN  1917537 A  2/2007
CN  102340599 A  2/2012
GB  2422506 A  7/2006

OTHER PUBLICATIONS

Brochure entitled Vocera Communications System, Wearable Instant Voice Communication, 2005, 4 pages.

*Primary Examiner* — Binh Kien Tieu
(74) *Attorney, Agent, or Firm* — Foley & Lardner LLP

(57) ABSTRACT

A communication server and accompanying communication devices allow near instantaneous communication between users of the communication devices. A communication device may be configured with multiple channels, where each channel is assigned a corresponding communication device. As the communication devices are registered with the communication server, each communication device has knowledge of other registered communication devices. Thus, communication devices may communicate nearly instantaneously with each other. Furthermore, as the communication device is equipped with multiple channels, a single communication device may host a conference call with other communication devices. In addition, communication device may include multiple buttons to control the communication device, and indicator lights to indicate the status of calls with other communication devices.

20 Claims, 26 Drawing Sheets

Related U.S. Application Data continuation of application No. 13/804,854, filed on Mar. 14, 2013, now Pat. No. 9,204,095.

(60) Provisional application No. 61/642,616, filed on May 4, 2012.

(51) Int. Cl.
  *H04N 7/15*       (2006.01)
  *H04M 3/56*       (2006.01)
  *H04N 7/14*       (2006.01)
  *G06F 3/0484*     (2013.01)
  *H04L 12/18*      (2006.01)

(52) U.S. Cl.
  CPC ........ *H04L 65/4038* (2013.01); *H04M 3/567* (2013.01); *H04N 7/142* (2013.01); *H04N 7/15* (2013.01); *H04L 12/1822* (2013.01)

(58) Field of Classification Search
  CPC . H04M 2203/2066; H04M 2203/6054; H04M 2207/20; H04M 3/382; H04W 4/10; H04W 52/10; H04W 52/50; H04W 72/005; H04W 76/45
  USPC ....... 379/93.05, 93.06, 93.07, 93.21, 100.06, 379/100.15, 102.07, 201.04, 202.01, 379/203.01, 204.01, 205.01, 206.11, 379/207.04; 348/14.03, 14.07, 14.08, 348/14.11
  See application file for complete search history.

(56) References Cited

U.S. PATENT DOCUMENTS

| | | | |
|---|---|---|---|
| 7,446,795 B2 | 11/2008 | Rengaraju | |
| 7,698,437 B2 | 4/2010 | Stogel et al. | |
| 7,760,721 B2 | 7/2010 | Stogel | |
| 7,860,524 B2 | 12/2010 | Laible et al. | |
| 7,970,425 B2 | 6/2011 | Balachandran et al. | |
| 8,095,665 B1 | 1/2012 | Bau | |
| 8,320,365 B2 | 11/2012 | Weintraub et al. | |
| 8,355,691 B2 | 1/2013 | Roy et al. | |
| 8,605,718 B2 | 12/2013 | Hemar | |
| 8,761,054 B2* | 6/2014 | Chow | H04W 4/10 370/259 |
| 9,204,095 B2* | 12/2015 | Jiang | G06F 3/04847 |
| 10,298,644 B2* | 5/2019 | Jiang | G06F 3/04847 |
| 2002/0057779 A1 | 5/2002 | Ahuja et al. | |
| 2004/0002351 A1 | 1/2004 | Upp | |
| 2005/0169223 A1 | 8/2005 | Crocker et al. | |
| 2005/0169252 A1 | 8/2005 | Riggs | |
| 2005/0249196 A1* | 11/2005 | Ansari | H04L 65/1033 370/352 |
| 2006/0121924 A1 | 6/2006 | Rengaraju | |
| 2007/0019571 A1 | 1/2007 | Stogel | |
| 2007/0253347 A1 | 11/2007 | Patel et al. | |
| 2008/0076391 A1 | 3/2008 | Chen et al. | |
| 2008/0152319 A1* | 6/2008 | Liang | H04N 21/4621 386/231 |
| 2008/0155113 A1* | 6/2008 | Lu | H04N 21/6587 709/231 |
| 2009/0010193 A1 | 1/2009 | Kolenchery | |
| 2009/0262668 A1 | 10/2009 | Hemar et al. | |
| 2009/0264103 A1* | 10/2009 | Chen | H04L 29/06027 455/411 |
| 2010/0046401 A1* | 2/2010 | Wright | H04L 47/15 370/260 |
| 2010/0153577 A1 | 6/2010 | Wohlert | |
| 2010/0227583 A1 | 9/2010 | Roy | |
| 2010/0234111 A1* | 9/2010 | Li | H04L 29/12018 463/42 |
| 2010/0246788 A1 | 9/2010 | Menard et al. | |
| 2010/0281108 A1* | 11/2010 | Cohen | H04N 21/235 709/203 |
| 2012/0151012 A1 | 6/2012 | Mustafa | |
| 2013/0097333 A1* | 4/2013 | Bathurst | H04L 29/06027 709/231 |
| 2013/0130735 A1 | 5/2013 | Roy | |
| 2014/0222931 A1 | 8/2014 | Hemar | |
| 2014/0314223 A1 | 10/2014 | Arthur | |
| 2015/0071426 A1* | 3/2015 | Weiner | H04L 65/4061 379/204.01 |

\* cited by examiner

INSTANT COMMUNICATIONS SYSTEM HAVING ESTABLISHED COMMUNICATION CHANNELS BETWEEN COMMUNICATION DEVICES

CROSS-REFERENCE TO RELATED APPLICATIONS

The present application is a continuation of U.S. patent application Ser. No. 14/954,693, filed Nov. 30, 2015, which is a continuation of U.S. patent application Ser. No. 13/804,854, filed Mar. 14, 2013, which is a non-provisional application claiming the benefit of U.S. Provisional Patent Application No. 61/642,616, filed May 4, 2012, each of which are hereby incorporated by reference in their entirety.

TECHNICAL FIELD

The present disclosure relates to the technical field of voice or video communications using electronic devices connected by wireless and wired networks. More specifically, the disclosure is directed to the technical field of voice or video communications using portable electronic devices connected by a wireless network (e.g., WiFi, Bluetooth, the cellular network, ultra wide band, WiMax) or a wired network (e.g., Ethernet, DSL).

BACKGROUND

Conventional communications devices such as phones typically don't offer the instant communications feature with a push of a button. On a typical phone, a user needs to press several buttons to dial a phone number. Then there is the ringtone waiting for the callee to pick up the call. So the communication is not instant and it requires pushing multiple buttons. A callee is the person who receives an incoming call. On the callee's end, a callee has to push at least a button to be able to hear the caller. Some cell phones have the push-to-talk feature that offers the instant voice with a push of button. However, push-to-talk on a cell phone is mainly designed for one-to-many type of group calls. Additionally, these push-to-talk calls are only half duplex, meaning communication is one way at any time, therefore only one party can talk at a time by seizing the floor first. There are instant messaging software systems that indicate the status of the other users and allow users to send instant messages to each other, but these systems don't provide instant voice or video services.

Additionally, a conventional phone call consists of two call legs: one call leg going from the caller to the callee and the other call leg going from the callee to the caller. Basically, both call legs have to be set up before the caller and callee can communicate. Callers and callees don't have control of the call legs separately.

In real life, a caller may only need to speak to a callee without any expectation of any response from the callee. Therefore only an outgoing call leg from the caller to the callee is needed. Similarly, a callee may only want to listen in on a call. Therefore there no need to set up a call leg from the callee to the caller. With traditional phones, there is no option for a caller or a callee to control the call legs.

Furthermore, the need for call set up on a broadband network is obviated as the network bandwidth grows. Call setup causes delay which hinders instant communications. The concept of call set up originates from the circuit switched networks where resources are scare and need to be allocated. As the voice communications evolve from circuit switched network to packet switched network, Voice over IP (VoIP) technologies were developed. VoIP also requires call setup due to the limited network resources at the time of its development. In today's wireless and fixed networks, resources are abundant relatively speaking in consideration of the bandwidth requirements of the real-time voice and video communications.

BRIEF SUMMARY

Given the advances of today's technologies, there is little need for the traditional call setup in today's broadband networks. The current call setup process hinders the natural ways in which people interact with one another. This disclosure provides for a communication system in which a communication channel is first established between two communication devices before any calls are placed. Minimal maintenance signaling messages are used to keep the channel up and alive. When a call is placed by a user, there is no call set up. One advantage of this setup is that it delivers the instant communications experience to users by removing unnecessary call set up and by providing intuitive user interface that mimics the natural ways people interact with one another. The end result is that users can communicate with one another as if they were all physically present in the same room.

Accordingly, this disclosure provides for one or more servers and portable communications devices connected via networks for instant communications. Furthermore, these devices may be connected to a wide area network, such as the Internet, via a wireless network such as a WiFi, Bluetooth, a cellular network, and the like. The devices may also be connected via a wired network, such as Ethernet, or combinations of wired and wireless networks.

This system facilitates instant communications among users via voice or video with a simple push of a button on corresponding devices. In contrast to a traditional phone call, there may be no dial tone or ringtone. There may be no picking up the call by the callee either. Additionally, one or more incoming and/or outgoing communication may be separately controlled by the users through button operations. The communication may be relatively instant and direct as if the users were physically present in the same room.

To support instant communications, or relatively instant communications, among a plurality of users, the instant communication system of this disclosure may include several operational modes. These operational modes are discussed below.

One-Way or Two-Way Communications

One-way communications means one person can speak to another person, but not vice versa. Two-way communications means two people can talk with each other.

One-to-One, One-to-Many, or Many-to-Many Communications

One-to-one means the communication is between two people. One-to-many means the communication is between one person and multiple people at the same time but separately. An example may be a dispatcher communicating with the taxi drivers that the dispatcher manages. The tax drivers can hear the dispatcher and talk with the dispatcher, but the taxi drivers cannot communicate with each other. Many-to-many means the communication is among multiple people at the same time, like in a traditional conference call.

Voice or Video

Voice means only voice communications may be used. Video means both voice and video communications may be used.

Any Combination of the Above

Users of the system can control the selection of the communication mode through the user interface of the disclosed device. For instance, a user may select the mode of a one-way one-to-one voice call. Alternatively, the user may select the mode of a one-way one-to-many video call. The devices that support video calls may include a display in addition to other components, such as a speaker and a microphone.

While this disclosure is directed to an instant voice system with instant voice devices, the term "voice" may also refers to any audio signals. Therefore, throughout this disclosure, "voice" and "audio" may be used interchangeably. The system may also be extended to support video communications.

DETAILED DESCRIPTION

Figure 1:
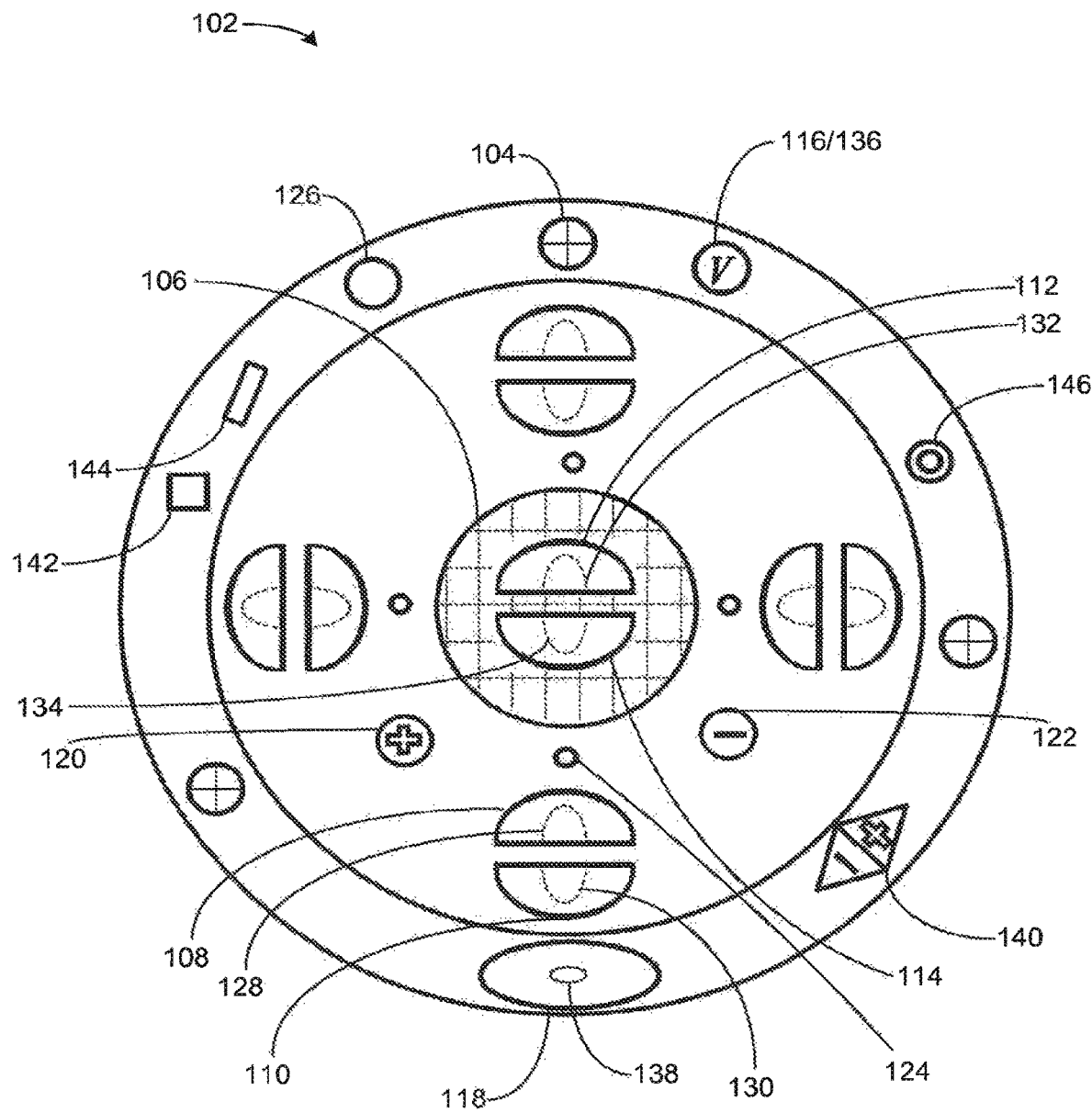
FIG. 1 illustrates an aerial view of an exemplary communication device according to aspects of this disclosure.

FIG. 1 illustrates an aerial view of an exemplary communication device 102 according to aspects of this disclosure. In one embodiment, the communication device 102 includes one or multiple microphones 104, speakers 106, Talk Buttons 108, Silence Buttons 110. The communication device 102 may also have a Talk to All Button 112, Silence All Button 114, Voicemail Button 116, Away Button 118 and the Instant Call Add 120 and Drop Buttons 122. While this disclosure references the controls of the communication device 102 as "buttons," any type of user control may be substituted for the disclosed buttons, such as knobs, switches, levers, or other such user controls.

Additionally, the communication device 102 may have various light indicators including a Channel Light 124, a Connectivity Light 126, a Talk Light 128, a Silence Light 130, a Talk to All Light 132, a Silence All Light 134, a Voicemail Light 136 and an Away Light 138.

Furthermore, the exemplary communication device 102 may be equipped with more than one of each of the light indicators and/or user controls. Thus, the communication device 102 may have multiple Talk Buttons, Silence Buttons, Channel Lights, Talk Lights, Silence Lights, and multiple other such user controls and light indicators.

The device 102 may also have a volume control 140, an On/Off Button 142, an audio line input/output 146, and a USB port 144.

A communications channel on the device 102 may be a bi-directional physical or logical connection to another device through which information flows. Such information may include multimedia streams, system signaling messages, and other such information. In general, a multimedia stream may include audio, such as speech, music, sound, or other types of audio, video, such as a movie, webcam recording, or other types of video, or combinations thereof. A multimedia stream may also contain only type of multimedia content (e.g., an audio-only multimedia stream or a video-only multimedia stream).

In one embodiment, the pair of Talk and Silence Button 108&110 is used to operate on a channel. There is a one-to-one mapping between a channel and a pair of Talk and Silence Buttons 108&110. One or more Channel Lights 124 may indicate the status of the channels.

The device 102 is connected to other devices (the "connected devices") via one or more communication channels. Accordingly, the device 102 may be in communication with multiple connected devices. On the device 102, each channel may be associated with an identifier that maps one-to-one an identifier of a connected device, such as an IP address. This mapping information may be configured and stored in a memory of the device 102.

When the Talk Button 108 is pressed down, the corresponding channel is in a talk mode. The corresponding Talk Light 128 turns red. When the button 108 is up, the corresponding channel is in the mute mode. The Talk Light 128 turns off. Pressing down the same button 108 repeatedly allows a user to alternate between talk and mute modes.

When a caller presses down a Talk Button 108, a one-to-one multimedia stream from the caller to the callee is initiated. The multimedia stream may include the caller's voice which is sent to the callee's device. If the callee responds by pressing down the Talk Button 108 on his device, then another one-to-one multimedia stream from the callee to the caller is initiated. Pairing these two multimedia streams of opposite directions creates the two-way one-to-one communications between the two devices. When the Silence Button 110 is up, it is in listen mode. The corresponding Silence Light 130 is dark. When the Silence Button 110 is down, it is in silence mode. The Silence Light 130 turns on. An incoming multimedia stream on the corresponding channel is silenced. Pressing down the same button repeatedly allows a user to alternate between listen and silence modes.

Figure 2:
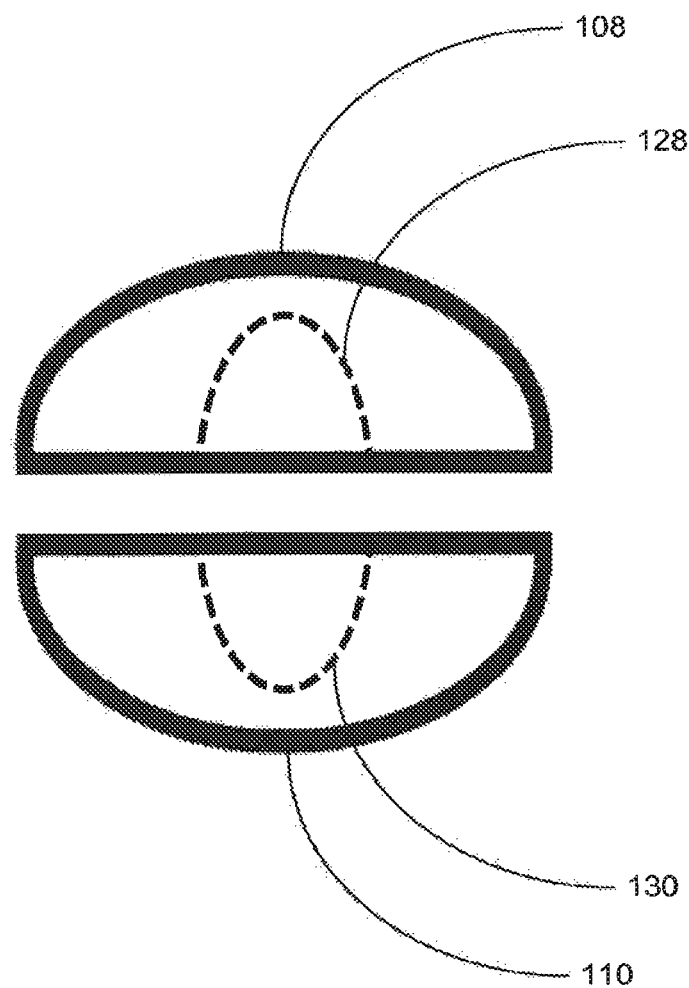
FIG. 2 illustrates an example of a Talk Button and a Silence Button of the communication device according to aspects of this disclosure.

Often times, a user may need to press on both the Talk Button 108 and the Silence Button 110 simultaneously. As shown in FIG. 2, the placement of the Talk Button 108 and Silence Button 110 is designed to conveniently allow a user to press on the buttons individually or together.

When a user presses down the Talk to All Button 112, then all the Talk Buttons on the device go down with it. This operation initiates the transmission of the audio streams going to all the connected devices. In one embodiment, the communication device 102 may forego audio mixing and may transmit multimedia streams containing only audio, such as the user's voice. The user is able to talk to all the users of the connected devices (the "connected users"). The connected users can hear the user. The Talk to All Light 132 and all the Talk Lights turn on. When the user presses on the Talk to All Button 112 again, he releases the Talk to All Button 112 as well as all the Talk Buttons on the device. This operation deactivates all the outgoing audio streams. The Talk to All Light 132 and all the Talk Lights turn off. In this case, the connected users can't hear the user anymore.

When a user presses down the Silence All Button 114, then all the Silence Buttons on the device are pressed down with it. This operation silences all the incoming audio streams on his device. All the Silence Lights and the Silence All Light 134 turn on. When the caller presses on the Silence All Button 114 again, he releases the Silence All Button 114 as well as all the Silence Buttons on the device. This operation un-silences all the channels, therefore the user can hear all the channels again. All the Silence Lights and the Silence All Light 134 turn off.

The Instant Call Add/Drop Button 120-122 is used to add or drop calls. The Call Add Light turns on when the Call Add Button is down.

If a user is walking away from his device, he can press down the Away Button 118. The Channel Lights on the connected devices corresponding to the user/device turn flashing green. This informs the users of the connected devices that this user is away. When the Away Button 118 is down, the Away Light 138 turns on.

The Connectivity Light 126 indicates whether the device is connected to the Instant Communications Servers or not.

The On/Off Button 142 serves several purposes.

Reset the device buttons to the original positions. When the device 102 is on, quickly pressing the Off button once will trigger this type of reset. The buttons that may be up by default will be returned to the up position. The buttons that may be down by default will be returned to the down position. This feature allows a user to return buttons to their default position with one push of a button.

Completely reset the device 102 to the factory default settings such as button position, channel configurations. When the device 102 is on, quickly pressing the Off button twice will trigger this type of reset.

Turn off the device 102, or power off the device 102. When the device 102 is on, pressing the Off button and holding it down for 5 seconds or more will turn the device 102 off.

Turn on the device 102, or power on the device. When the device 102 is off, pressing the On button will turn the device 102 off.

The volume control 140 adjusts the volume of the speakers.

The audio line is for the audio input and output connected with a headset.

For power, a lithium-ion battery can be charged through the USB port 144. Additionally, the USB port 144 can be used for the device to connect to other machines such as a laptop via a USB cable.

Figure 3:
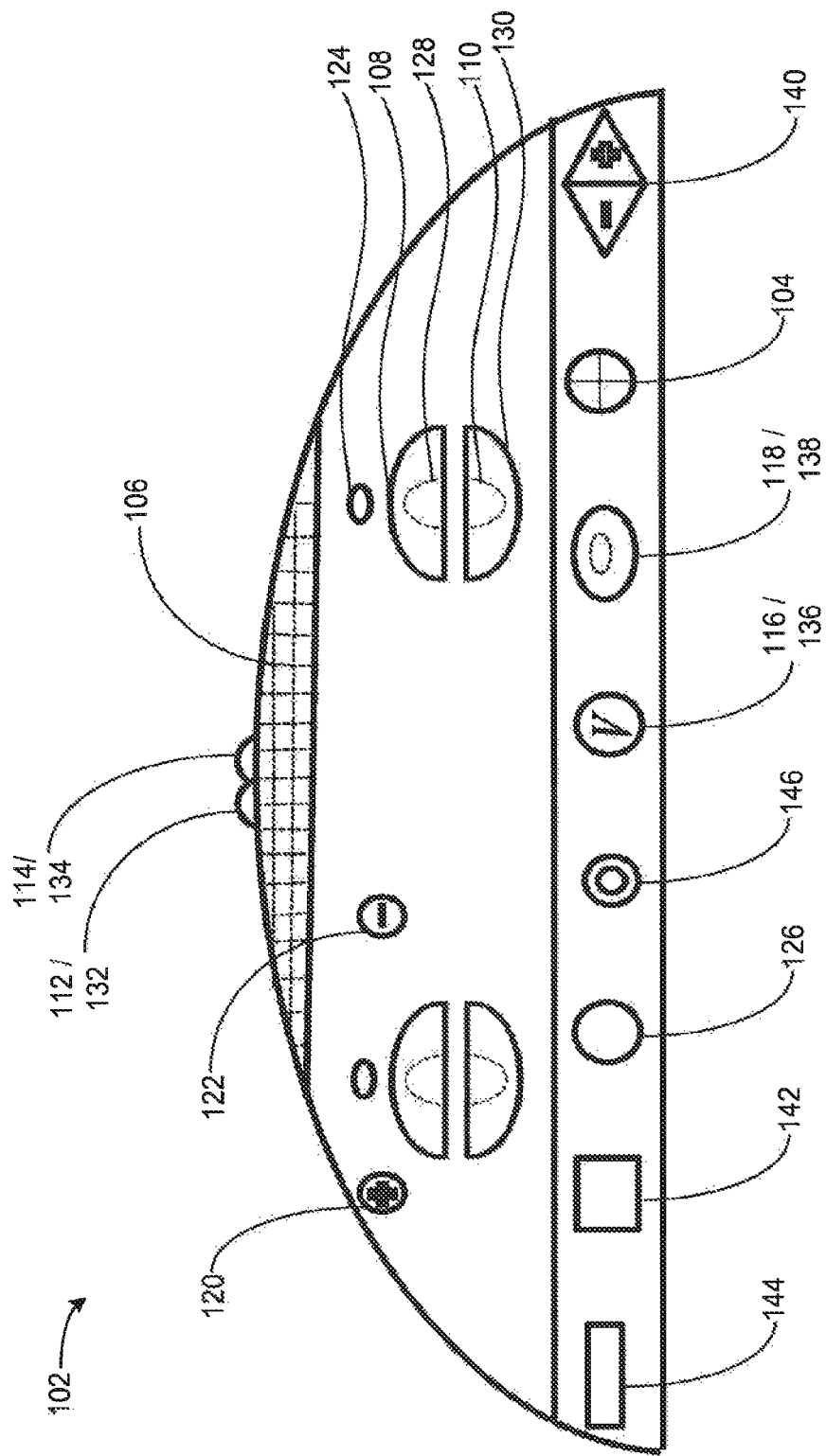
FIG. 3 illustrates a side view of the communication device according to aspects of this disclosure.

FIG. 3 illustrates a side view of the communication device 102 according to aspects of this disclosure. In one embodiment, the device 102 may take on the shape of a dome.

Figure 4:
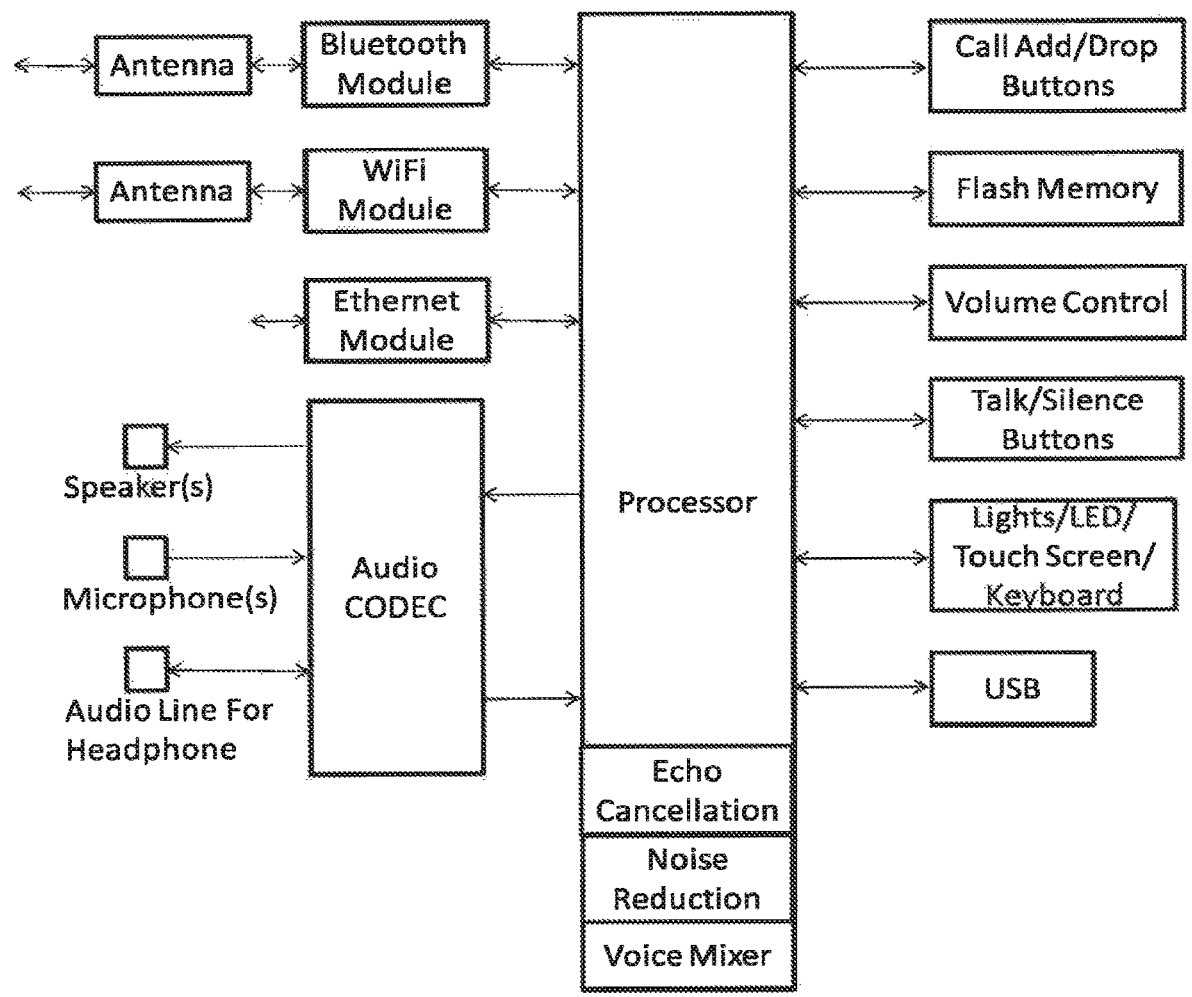
FIG. 4 illustrates an exemplary hardware diagram of the communication device according to aspects of this disclosure

FIG. 4 illustrates an exemplary hardware diagram of the communication device 102 according to aspects of this disclosure. A processor, such as a Complex Instruction Set Computing ("CISC") or a Reduce Instruction Set Computing ("RISC") processor, may control one or more aspects of the device. Audio CODEC encodes analog audio as digital signals and converts digital signals back into analog signals. Even though the device may use a wired network such as the Ethernet, or a cellular network, the device 102 may also use a wireless network interface that is cellular, WiFi or Bluetooth. The processor may further include additional sub-modules, such as an audio mixer, echo cancellation, and noise reduction.

Echo Cancellation and Noise Reduction functions are used to enhance the voice quality by removing echo and reducing noise in the speech. There may be multiple microphones that could form a microphone array to help further enhance the speech quality.

The Audio mixer function is leveraged for a conference call where multiple audio streams from conference call participants are mixed into a composite audio stream of multiple voices.

Figure 5:
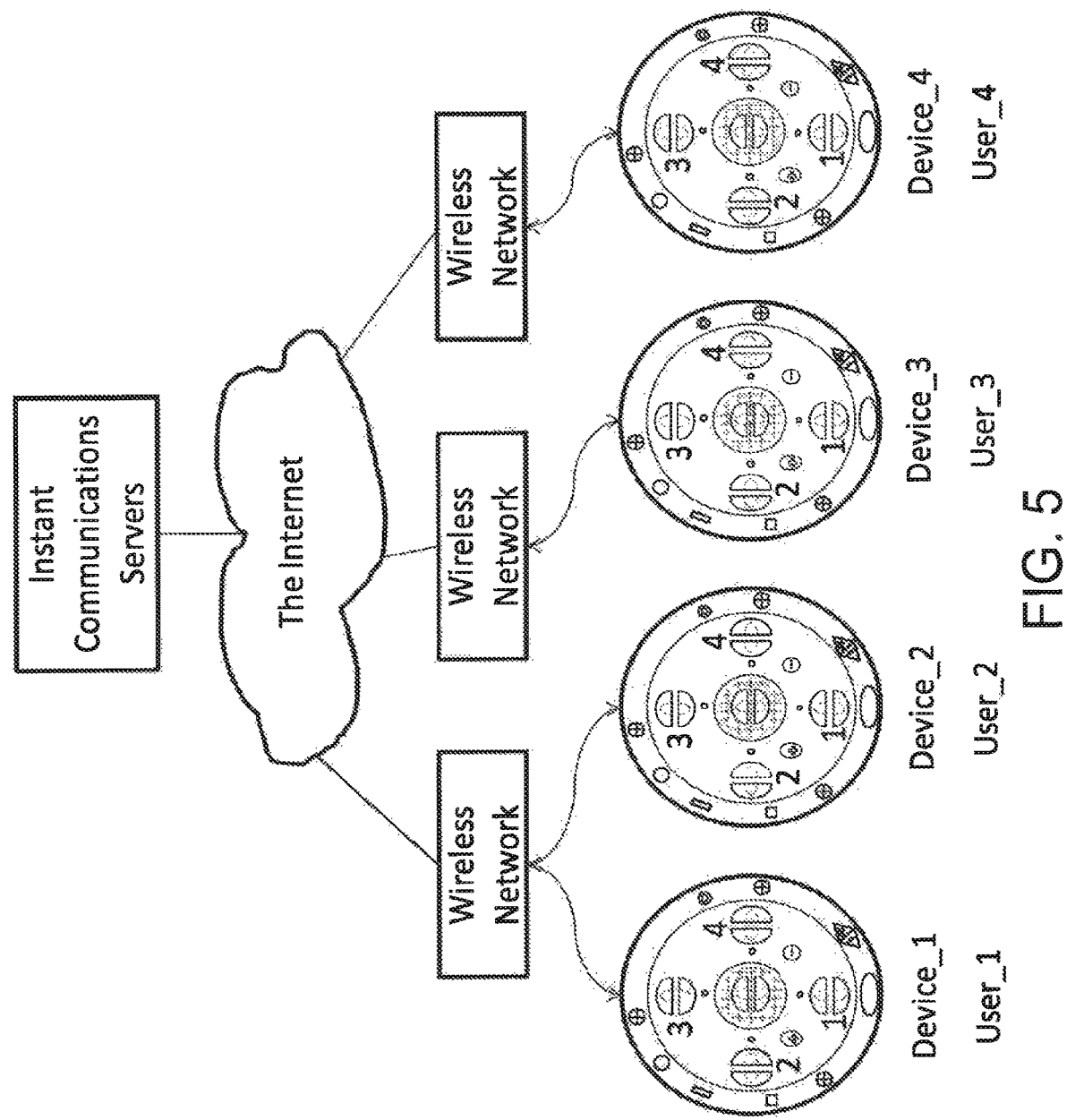
FIG. 5 illustrates multiple communication devices in communication with each other and a communication server according to aspects of this disclosure.

FIG. 5 illustrates multiple communication devices in communication with each other and a communication server according to aspects of this disclosure. In one embodiment, the device may be connected via one or more wireless networks to the Internet. One or more communication servers may communicate with the devices. This system architecture supports both instant voice and video communications.

While FIG. 5 illustrates four devices, the system architecture may support any number of devices. Each device supports certain number of channels. If the channel operation uses physical buttons, then the number of channels on a device is limited by the number of Talk Button 108 and Silence Button 110 pairs. In another implementation, where the channel operation uses virtual buttons on touch screen, then the number of channels supported on the touch screen may be nearly unlimited.

A user of a device can use the device for instant communications with another user of another device. Additionally a group of users can communicate with each other by using their devices. But first, they need to configure the channels on their devices to correspond to the other users or devices.

Figure 6:
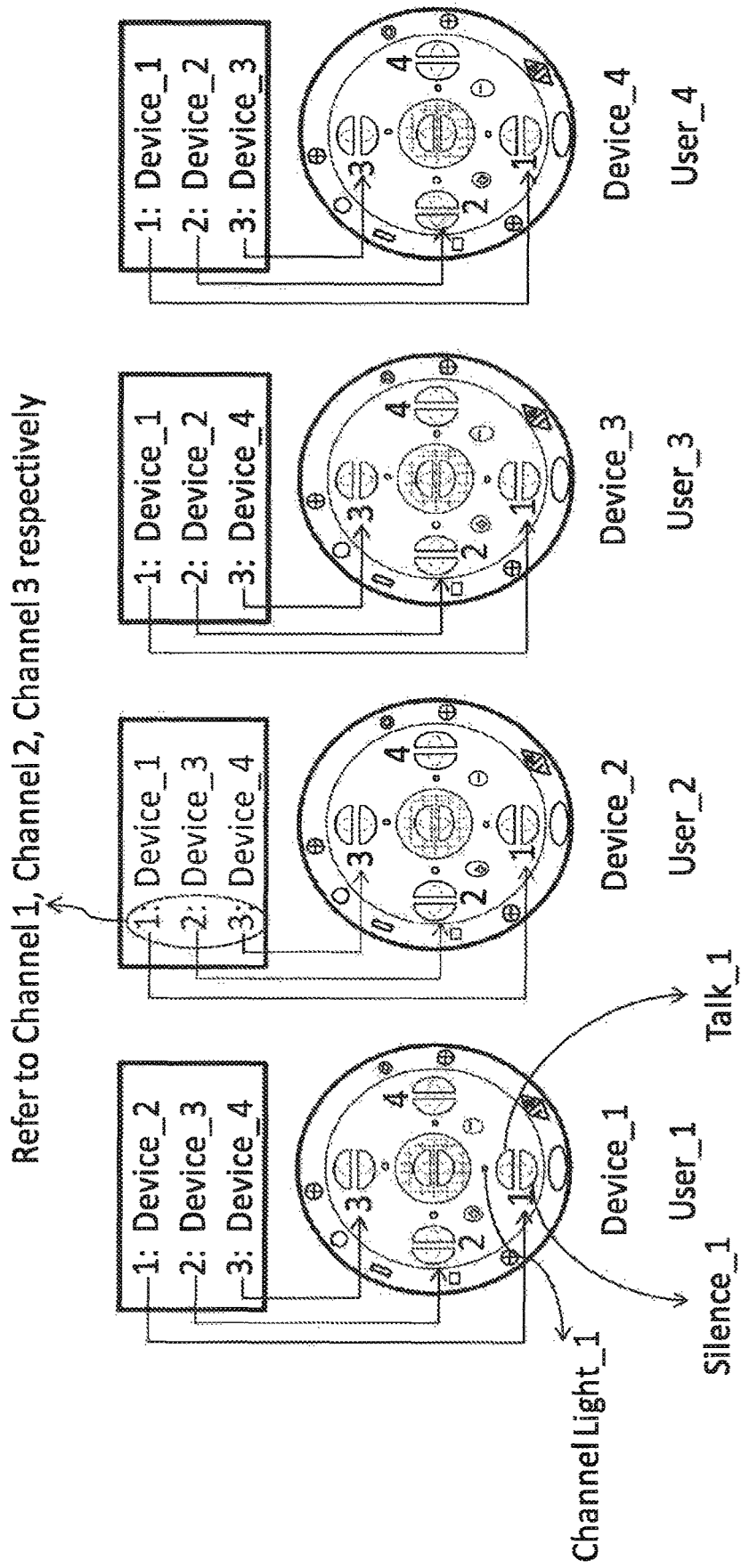
FIG. 6 illustrates an example of configuring the channels of the communication device according to aspects of this disclosure.

FIG. 6 illustrates an example of configuring the channels of the communication device according to aspects of this disclosure. As illustrated in FIG. 6, User_1 is the user of Device 1, User_2 is the user of Device_2, User_3 is the user of Device_3, User_4 is the user of Device_4.

In one embodiment, there may be multiple channels on a device. These channels are configured by its user to connect to a specific set of devices.

As shown in FIG. 6, channel 1, 2 and 3 on a device refer to the three channels. The three channels are denoted by Channel 1, Channel 2 and Channel 3, respectively. The Talk Button of Channel 1 on Device_1 is referred to as "Talk 1", and the Silence Button of Channel 1 on Device 1 is referred to as "Silence 1". Additionally, the Channel Light of Channel 1 on Device_1 is referred to as "Channel Light 1".

Additionally, FIG. 6 shows the mapping between a channel and another device. On device 1, user_1 configures Channel 1, Channel 2 and Channel 3 on Device_1 to connect to three devices respectively: Device_2, Device_3 and Device_4. Channel 4 isn't configured on Device 1. Device_2, Device_3 and Device 4 are called "connected Devices" to Device 1. Similarly Channel 2 of Device_2 is connected to Device_3, and Channel 3 of Device 4 is connected to Device 3.

Additionally, in order to support voice-activated calling, users can program each channel on his device by speaking a nickname into the microphone during the configuration process. For instance, on Device 1, Channel 1 connects to User 2 whose nickname is John. User 1 of Device 1 can configure Channel 1 by speaking "John" to the microphone during the configuration process. This way, when User_1 speaks to Device_1 by saying a command "Call John", Device_1 will initiate a audio stream from Device 1 to Device 2. Command "Call John" is equivalent to User_1 pressing down the Talk_1 button.

The voice communications from a caller to a callee is instant. By simply pressing down the Talk Button 108, the caller can speak to a callee directly. There may be no dialing of digits and there may be no dial tone.

The callee may first hear a sound to indicate an incoming audio stream. At the same time, a Channel Light corresponding to the caller's device flashes a red light to indicate which channel the caller is coming though. The callee may then hear the voice of the caller instantly on speaker without any need to do anything. It may appear like two people communicate with each other as if they were physically present in the same room.

The callee can then decide whether to respond or not. If the callee decides to respond, he/she can simply press down the Talk Button next to the flashing red light and speak directly to the caller. Now the caller and callee can speak with each other.

A user can talk to all the channels connected to a preconfigured set of devices. By simply pressing down the Talk to All Button 112, the user can speak to a group of users directly. The group of users can hear the user instantly on speaker.

A user can toggle between Talk Buttons including the Talk to All Button 112 seamlessly and effortlessly. For instance, a caller can speak to a first callee by pressing down the corresponding Talk Button (the first Talk Button), then she presses down another Talk Button (the second Talk Button) to switch to speak to a second callee. At this time, the first Talk Button is released and the paired Silence Button goes down and stays down. Since the second Talk Button is pressed down, she can talk to the second callee. Then she can switch back to the first callee by pressing down the first Talk Button.

Using the Silence Button 110, a user can control what he hears. By pressing down the Silence Button 110 of a channel, he can silence the channel. By pressing down the Silence All Button 114, he can silence all the channels.

A user can indicate his availability via an Away Button 118. By pressing down the Away Button 118, he indicates to the other connected devices that he is away.

As discussed previously, multiple modes of communications are supported. They include one way one-to-one and one-to-many communications. They also include two way one-to-one, and one-to-many communications. Furthermore, an instant conference call can be supported among multiple users. The basic one way one-to-one communication channel is used as a basic building block to construct more complex communications modes.

There is no limit to the number of devices in the system. It can be a self-contained home system that resides on a Local Area Network (LAN) that contains only a few devices. Or it can be connected to millions of other devices via the Internet.

There is no constraints to the location of devices as long as they can communicate with each other via a networking protocol, such as the Internet Protocol (IP).

2.1. Talk Button 108 Operation Rules

The Talk Button 108 operation including the Talk to All Button 112 on a device follows these operation rules:

When a Talk Button 108 is down, the corresponding user's voice is sent over the corresponding channel.

When multiple Talk Buttons are down, the user's voice is sent over the corresponding multiple channels.

When a user presses down a Talk Button on the device, the button stays down when the user stops pressing.

When a user presses down the Talk to All Button 112 on the device, the Talk to All Button 112 stays down when the user stops pressing. Additionally all the Talk Buttons on the device go down and stay down. The user's voice is sent to all the connected devices.

If a user presses on a Talk Button 108 that is already down, then the Talk Button 108 is released. Releasing the Talk Button 108 stops sending the user's voice over the corresponding channel. It is similar to the mute feature on a traditional phone.

When a user presses on the Talk to All Button 112 that is already down, the Talk to All Button 112 is released. Additionally all the Talk Buttons are released.

When a user presses down two or more Talk Buttons simultaneously, then these buttons stay down together when the user stops pressing.

Where one or more Talk Buttons are down on a device, and the user presses down another Talk Button that is up, then all the Talk Buttons that were down are released, and this Talk Button remains down. Additionally, the Silence Buttons pairing with the previously down Talk Buttons go down and stay down.

If two or more Talk Buttons are already down, and the user presses down on one or more of the Talk Buttons that are down, then only those pressed buttons are released. The other down buttons remain down.

To release a Talk to All Button 112, a user can press on the Talk to All Button 112 again. This will release the Talk to All Button 112 as well as all the Talk Buttons. Alternatively he can press on a Talk Button which may be down already. Pressing on this Talk Button 108 will release this Talk Button as well as the Talk to All Button 112. If any one of the Talk Buttons on the device is up, then the Talk to All Button 112 will be released. However, the other Talk Buttons remain down.

A Talk Button 108 has a Talk Light 128 that can light up when the Talk Button 108 is down, and the Talk Light 128 turns off when the Talk Button 108 is released. When the Talk Button 108 is pressed down on one device, it causes a corresponding Channel Light on the connected device to turn flashing red light on.

2.2. The Silence Button 110 Operation Rules

The Silence Button 110 operation including the Silence All Button 114 on a device follows these operation rules:

When a Silence Button 110 is pressed down, the incoming audio stream on the corresponding channel to the device is silenced.

When a Silence All Button 114 is pressed down, all the incoming audio streams to the device are silenced.

When a user presses down any one or multiple Silence Buttons on the device, the buttons stay down when the user stops pressing.

When a user presses down the Silence All Button 114 on the device, the Silence All Button 114 stays down when the user stops pressing. Additionally all the Silence Buttons go down and stay down.

If a user presses on a Silence Button 110 that is already down, then the Silence Button 110 is released.

If a user presses on a Silence All Button 114 that is already down, then the Silence All Button 114 is released. Additionally, all the Silence Buttons are released.

If a Silence Button 110 including the Silence All Button 114 is already down, and the user presses on another Silence Button 110 that is up, then the both Silence Buttons remain down.

When a user presses down two or more Silence Buttons including the Silence All Button 114 simultaneously, then these buttons stay down together when the user stops pressing.

If two or more Silence Buttons including the Silence All Button 114 are already down, and the user presses down one or more of the Silence Buttons that are already down, then the pressed buttons are released. The other down buttons remain down.

A Silence Button 110 has a Silence Light 130 that can light up when it is pressed down, and the light turns off when the Silence Button 110 is released. However the operation on the Silence Button 110 on one device doesn't change the Channel Light on the corresponding connected device. So the user of the connected device doesn't know he is being silenced.

2.3. Interaction between Talk Button 108 and Silence Button 110:

If a Silence Button 110 on a device is down, a user presses on the Talk Button 108 corresponding to the same channel, then the Silence Button 110 is released. For example, when the Silence_1 button on Device_1 is pressed down, User_1 can't hear User_2. Then if User_1 presses down Talk_1 button on Device 1, then Silence_1 button is released. At this time, User_1 and User_2 can hear each other. Note that the Channel Light of the corresponding channel on Device_2 behaves independently from the Silence Button 110 actions on Device 1.

If a Talk Button 108 on a device is down, then a user presses down the pairing Silence Button 110, then the Silence Button 110 stays down.

If a first Talk Button on a device is down, then a user presses on a second Talk Button that is up, then the first Talk Button 108 is released. Additionally, the Silence Button paired with the first Talk Button goes down and stays down. This feature allows a user to toggle between two channels with minimal operation.

2.4. Voicemail Button and Voicemail Light

The Voicemail Light indicates the existence of new voicemail messages. Pressing down the Voicemail button, a user can listen to voicemail messages starting with the most recent ones first. Pressing on the button again, the user deletes the current message and skips to the next voicemail message. The current message is deleted even if it is not completely listened to. Instead of pressing the Voicemail Button once, if a user quickly presses the button twice, the user can save the current message and skips to the next message.

2.5. Call Add and Call Drop Button Operation Rules

A Call Add Button is used to add another user to an existing call, creating essentially an instant conference call. To add a user, press the Call Add Button first, then press down the Talk Button 108 corresponding to the added user. The Call Add Button does not stay down when pressed. The Call Add Light will turn red to indicate the existence of a conference call. The corresponding Talk Button 108 stays down and the Talk Light 128 turns red. On the connected device of the added user, he will hear a sound alert for the incoming audio stream. Additionally, the corresponding Channel Light on his device flashes red light.

A user can also add all the users on his device to the conference call at once by pressing the Call Add Button first, then press down the Talk to All Button 112. The Call Add Button does not stay down when pressed. The Call Add Light will turn red to indicate the existence of a conference call. The Talk to All Button 112 as well as all the Talk Buttons on the device stay down. The corresponding Talk to All Light 132 as well as all the Talk Lights turn red. On the devices of the corresponding users, they will hear a sound alert for the incoming audio stream. Additionally, the corresponding Channel Lights on their devices flash red light.

A Call Drop Button is used to terminate a call with another user. A Call Drop Button has no light indicator. To terminate a conference call, the conference call host presses the Call Drop Button first, and then presses the already down Talk Button 108 corresponding to the participant to be dropped. The Talk Button 108 will be released.

The call between the host and the participant is terminated. Both devices stop sending audio streams to each other. Both users will hear a sound alert indicating the termination of the call. Additionally, the corresponding Talk Button 108 on the participant's device is released as well. The corresponding Channel Lights on both devices turn green.

A conference call host can first press the Call Drop Button, and then presses the Talk to All Button 112. All the Talk Buttons will be released. The call between the host and all the participants is terminated. The participating devices of the conference call stop sending out audio streams. All parties involved will hear a sound alert on the conference call indicating the termination of the conference call. Additionally, the corresponding Talk Buttons on participants' devices are released as well. The corresponding Channel Lights on all the participating devices turn green. Note that the Talk to All Button 112 stays up after the Call Drop Button is pressed first and then the Talk to All Button 112 is pressed next.

Note that if the host presses the Call Drop Button first, and then presses a Talk Button 108 that is up. Then the Talk Button 108 stays up. In other words, a Talk Button 108 stays up after the Call Drop Button is pressed first and the Talk Button 108 is pressed next.

In addition, note that the Call Add Light on the device that initiated the conference call will turn dark once the conference call is completely terminated, meaning no active channels of the conference call on the device remains.

2.6. Channel Lights:

A Channel Light of a channel on a device indicates the status of the channel connected to another device or user. For instance, the Channel Light of Channel 1 on Device_1 (Channel Light 1) indicates the channel status with Device_2 or User 2.

A Channel Light may have these colors: dark, green, red, flashing red, and flashing green. Alternative or additional colors may also be used.

Dark

Dark lights indicate no network connectivity between two devices. For instance, when Device_1 and_2 are not connected, then Channel Light_1 on Device_1 and Channel Light_1 on Device_2 are both dark. First, if the channel corresponding to a Talk Button 108 is not configured, the Channel Light is dark. Second, when a Channel Light is dark, the corresponding communications channel cannot be established. For instance, if Channel Light_1 on Device_1 is dark, then a communications channel cannot be established between Device_1 and Device_2. Usually if there is no connectivity, it goes both ways. So both Channel Lights on Device 1 and Device 2 are dark.

Green

Green indicates there is network connectivity between two devices. For instance, Channel Light_1 on Device_1 and Channel Light_1 on Device_2 both turn green if a connection between Device 1 and Device 2 is established.

Flashing Green

Flashing green indicates that the user of the other device corresponding to the channel is away. For instance, when Channel Light_1 on Device_1 is flashing green light, it means that User_2 of Device_2 is away. There is an Away Button 118 on Device_2. If User_2 presses down the Away Button 118, then the corresponding Channel Lights of Channel 1 on Device 1, Channel 2 on Device_3 and Channel 2 on Device_4 are all flashing green. Pressing down the Away Button 118 again, User_2 releases the button, and the corresponding Channel Lights of Channel 1 on Device 1, Channel 2 on Device_3 and Channel 2 on Device_4 all become green.

Flashing Red

A flashing red light indicates an incoming audio stream on the corresponding channel that hasn't been answered. For instance, if there is an incoming audio stream from Device_2 to Device 1, then Channel Light_1 on Device_1 turns flashing red. A flashing red light is used to tell the user on which channel the call is coming in from.

Red

If a channel has a flashing red light and the user presses down the Talk Button 108 of the channel, then the Channel Light turns steady red. When there are both incoming and outgoing multimedia streams on a channel, the corresponding Channel Light turns steady red.

In summary, the Channel Light is flashing red if there is an incoming multimedia stream. The Channel Light is steady red if there are incoming and outgoing multimedia streams on the channel. The Channel Light is neither color when there is only an outgoing stream on the channel. For instance, the Channel Light on a device will turn from red light to flashing red light if the user releases the Talk Button 108 of the channel.

In one embodiment, the Channel Light of a channel may be configured to display one color at any given time. Moreover, each of the colors of the Channel Light may be assigned a priority. In terms of priority, the display priority may be in the order of high to low: red, flashing red light, flashing green light, and green light. In other words, if two states are both true, the one with a high priority will be indicated by the Channel Light. For instance, if a user is away, and the user presses down a Talk Button 108, then the Channel Light on the connected devices may indicate flashing red light. Or if a user is away, and the connectivity between the two devices is good, then the flashing green light on the connected devices may be on.

2.7. Other Light Indicators:

Talk to All Light 132

When the Talk to All Button 112 is not pressed down, the Talk to All Light 132 remains dark. If a user presses down the Talk to All Button 112, the Talk to All Light 132 turns steady red. The Talk to All Light 132 may be embedded inside the Talk to All Button 112. One-way one-to-many audio streams may be initiated from a first device to the other connected devices.

Talk Light 128

When a Talk Button 108 is not pressed down, the Talk Light 128 remains dark. If a user presses down the Talk Button 108, the Talk Light 128 turns steady red. The Talk Light 128 may be embedded inside the Talk Button 108.

Silence All Light 134

When the Silence All Button 114 is not pressed down, the Silence All Light 134 remains dark. If a user presses down the Silence All Button 114, the Silence All Light 134 turns steady red. The Silence All Light 134 may be embedded inside the Silence All Button 114.

Silence Light 130

When a Silence Button 110 is not pressed down, the Silence Light 130 remains dark. If a user presses down the Silence Button 110, the Silence Light 130 turns steady red. The Silence Light 130 may be embedded inside the Silence Button 110.

2.8 Sound Indicators

Whenever there is an incoming audio stream, a sound may be played to indicate the incoming audio stream on the receiving device.

A different sound may be played on both ends of the channel, whenever a channel is terminated using the call drop feature.

2.9. Use Cases:

All of the following use cases assume that the devices are configured as shown in FIG. 6.

If the Talk_1 button on Device_1 is pressed down, the audio stream from Device 1 to Device 2 is initiated. User_1 can speak to User_2 and User_2 can hear User 1. However, User_1 can't yet hear from User_2. Similarly, on Device_2, pressing down Talk_1 initiates the audio stream from Device_2 to Device 1. Pairing these two channels of opposite directions forms the two-way one-to-one communication between Device 1 and Device 2. Therefore User 1 and User 2 can hear each other.

When a user of a device presses down two Talk Buttons simultaneously, one-way one-to-two audio streams are initiated. For instance, on Device 1, if User_1 presses down both Talk_1 and_3. In this case, User_1 can be heard by User 2 and 4. User 1 can't hear User 2 or User 4. User 2 and User 4 can't hear each other.

On Device 1, three out of the four available channels are configured to connect to Device_2,_3, and_4. When the Talk to All Button 112 on Device_1 is pressed down, one-way one-to-three audio streams are initiated. In this case, User_1 can speak to all channels. User_2,_3, and_4 can hear User 1, but User_1 can't hear from User_2,_3 or_4.

Similarly, a user of a device can deactivate a audio stream by releasing a Talk Button 108. There are multiple ways to release a Talk Button 108 as described by the Talk Button 108 Operation Rules. Once the Talk Button 108 is released, the audio stream is deactivated. For instance, on Device 1, if both Talk_1 and Talk_2 buttons are already down and User_1 releases the Talk_1 button by pressing on it, the Talk_2 button stays down. In this case, the audio stream from Device_1 to Device_2 is deactivated, but the audio stream from Device_1 to Device_3 stays on.

Users of Device 1, Device_2, Device_3, and Device_4 can establish different types of calls by pressing down different combinations of Talk Buttons. For instance, User_1 can press down the Talk to All Button 112 on Device 1. As a result, all the Talk Buttons on Device_1 go down and stay down. Now User_1 can be heard by User_2, User_3 and User 4. User_2 can press down Talk_1 button on Device_2, and User_3 can press down Talk_1 button on Device_3. User_1 can hear User_2 and User_3. At this time, if User_1 presses on the Talk_1 button on Device 1, then the Talk to All Button 112 and Talk 1 button on Device 1 are released. User 2 can't hear User_1 anymore. User_1 and User_3 can still hear each other. User 1 can still hear User 2.

2.10. Handling of Incoming Audio Streams

A callee may get an incoming audio stream while his device is idle, meaning there is no active channels. When an incoming audio stream comes in on a channel, the Channel Light of the channel flashes red light. There is also a sound notification to alert the callee. The voice of the caller is immediately played out via the speaker. The callee doesn't need to do anything in order to hear the caller because the Silence Button 110 of the channel is up by default. When the callee presses down the Talk Button 108 of the channel, the Talk Button 108 on the callee's device turns red. The Channel Lights on both the caller's and the callee's devices will turn red. Additionally, a sound alert is played on the caller's device. The caller will first hear a sound alert and then the callee's voice.

A callee may get an incoming audio stream while talking to and/or listening to one or more users on certain channels ("the active channels"). An incoming audio stream from another caller causes the corresponding Channel Light to flash red light assuming this channel is different from the active channels. There is also a sound alert played on callee's device. However the voice of the incoming audio streamer can't be heard because the device is not idle. If the callee decides to pick up the call by pushing down the Talk Button 108 of the incoming audio stream channel, then the voice of the incoming audio streamer can be heard by the callee. Pushing down the Talk Button 108 of the incoming audio stream channel causes the down Talk Buttons of the active channels to be released, therefore muting the callee on these channels. It also causes the Silence Buttons of the active channels to go down and stay down, thus silencing the active channels.

For instance, User_1 of Device_1 may speak to User_2 and User_3 by pressing down Talk_1 and Talk_2 buttons simultaneously. An incoming audio stream comes in on Channel 3 of Device_1 from User_4. Channel Light_3 flashes red light on Device 1. A sound alert is played on Device 1. User_1 can't hear User_4. If User_1 presses down Talk 3, then User_1 will hear User_4, and User_4 can hear User 1. Essentially two-way audio streams between User_1 and User_4 are initiated. Additionally Talk_1 and Talk_2 buttons are released, and the Silence_1 and Silence_2 buttons go down and stay down.

In another case where User_1 of Device_1 is listening to (instead of speaking to) User_2 and User_3, an incoming audio stream comes in on Channel 3 from User_4. Channel Light_3 flashes red light on Device 1. A sound alert is played on Device 1. User_1 can't hear User_4 yet. If User_1 presses down Talk 3, then Silence_1 and Silence_2 go down. Now User_1 and User_4 can talk to each other, but User_1 can't hear User_2 or User_3 anymore. If there are any Talk Buttons that are currently down, they are released as well. This operation effectively deactivated the streams between User_1 and User_2, and also between User_1 and User_3. It initiates the two-way streams between User_1 and User_4.

2.11. Conference Call

An Instant Conference Call may be defined as having more than two parties on a call where all parities can hear each other like on a traditional conference call. However, the difference between the instant conference call and the traditional conference call is that the instant conference call has the instant voice feature. There is no dialing of digits. There is no dial tone or ringtone. It gives users full control of the call through a combination of button operations such as add and drop, Talk and Silence, and Talk to All and Silence All. Several combinations of the instant conference call operations result in new call features that are not supported by the traditional conference call. For simplicity, instant conference calls and conference calls are used interchangeably in this document. Traditional conference calls as people know it today are specifically referred to as "traditional conference calls".

For a user ("the host") to start an instant conference call, he may use the Call Add Button. He first presses down the Talk Button corresponding to a first participant. He then presses the Call Add Button. Then he presses down a second Talk Button corresponding to a second participant. Note that when the Call Add Button is pressed, it doesn't stay down. Also the Call Add Light turns on when it is pressed and stays on until the conference call is completed. The corresponding Talk Lights also turn red.

To drop a participant from a conference call, the host presses on the Call Drop Button. Then he presses the Talk Button corresponding to the participant that he intends to drop. When the Call Drop Button is pressed, it doesn't stay down. The corresponding Talk Button is released on the host device and the Talk Light turns off. The corresponding Talk Button on the participant's device is also released and the Talk Light 128 turns off. Additionally, a sound alert is played on the conference call to indicate the termination of the call with this participant. Now the participant can't be heard on the conference call. The corresponding Channel Lights and the Talk Lights on both the host and the participant's devices turn off.

For a participant to drop himself off a conference call, the participant presses on the Call Drop Button. Then he presses the Talk Button corresponding to the conference call. When the Call Drop Button is pressed, it doesn't stay down. The corresponding Talk Button is released on the participant's device and the Talk Light turns off. The corresponding Talk Button on the host's device is also released and the Talk Light turns off. Additionally, a sound alert is played on the conference call to indicate the termination of the call with the participant. Now the participant can't be heard on the conference call.

In order to host a conference call with users of all the connected devices, the host can first press the Call Add Button, then he can simply press the Talk to All Button 112. Like a Talk Button 108, if a Talk to All Button 112 is pressed down, it remains down. The Talk to All Light 132 also turns on. The Talk to All Button 112 represents all the Talk Buttons on the device. Therefore, all the Talk Buttons go down with it and the Talk Lights turn red. The users of all the connected devices are added to the conference call.

In order to terminate a conference call at once, the host can first press the Call Drop Button, then he can simply press Talk to All Button 112. The Talk to All Button 112 represents all the Talk Buttons on the device. Therefore, all the Talk Buttons along with the Talk to All Button 112 on the host's device will be released and the conference call is terminated at once. Additionally, all the corresponding Talk Buttons on the participants' devices are also released. When the conference call is terminated for all the parties, a sound alert is played on the conference call to notify all parties that the conference call is terminated.

When the conference call is terminated completely on the device, the Call Add Light turns off. In other words, the Call Add Light indicates if there is an ongoing conference call hosted by the device or not.

11.1. Audio Mixing

Audio mixing may be required for a conference call. The audio mixing function is provided by the device of the conference call host. Assume that User 1 is the host. Consider two voice calls between the host (User 1) and two participants (User_2 and 3). Without audio mixing, User_2 and_3 can talk to User 1, but not to each other. When audio mixing is enabled on Device 1, Device_1 mixes the audio streams as described below, which enables 3-way conferencing, and all three can talk to each other.

Device_1 mixes the voices of User 1, User_2 and User_3 and plays out the mixed voices via its speaker.

Device_1 mixes User 1's voice with the audio stream that it receives from User_2, and sends the mixed voices to User_3.

And Device_1 mixes User 1's voice with the audio stream that it receives from User_3, and sends the mixed voices to User 2.

As a result of audio mixing, User_2 can hear User_3, and User_3 can also hear User_2 even though User_2 and User_3 are not directly connected with each other. All three users can hear each other on the conference call.

Figure 7:
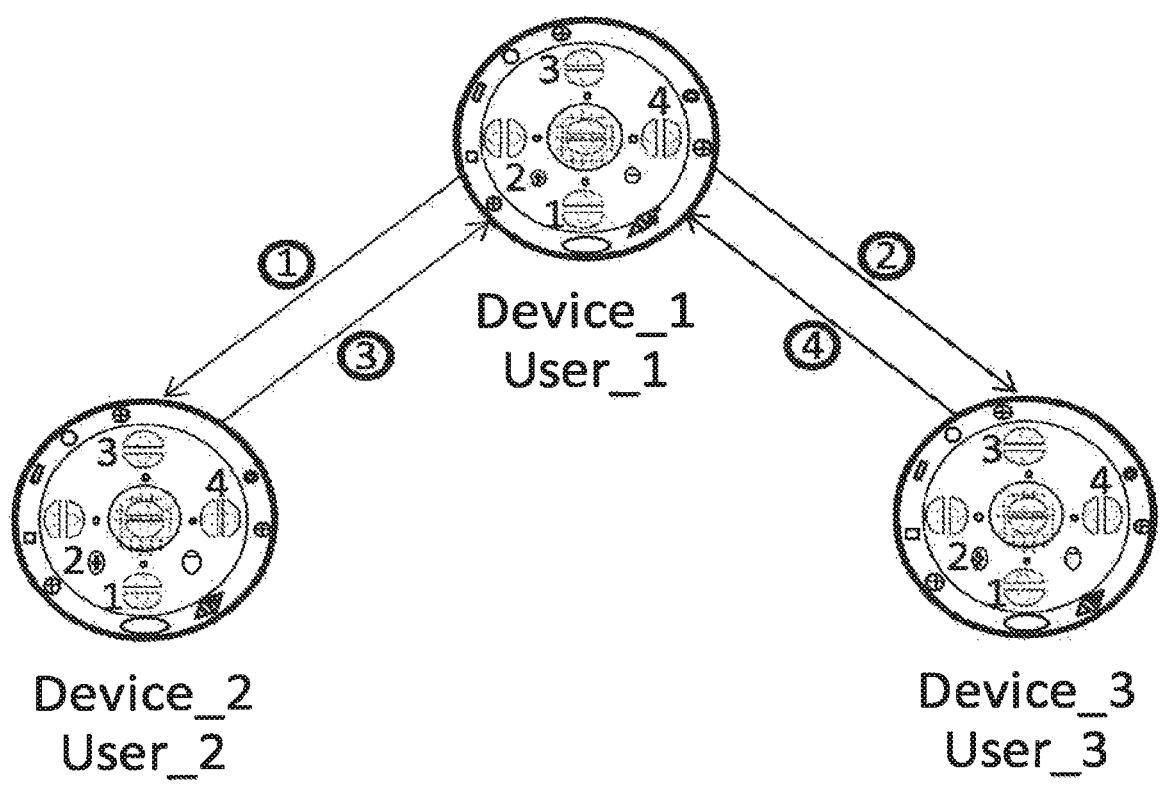
FIG. 7 illustrates a conference call among multiple communication devices according to aspects of this disclosure.

FIG. 7 illustrates a conference call among multiple communication devices according to aspects of this disclosure. In particular, FIG. 7 illustrates a step-by step process for User_1 to start a conference call with User_2 and User_3 sequentially.

Step 1: User_1 presses down Talk 1. Now an audio stream from Device 1 to Device 2 is initiated. User 2 can hear User 1. Step 2: User_1 presses the Call Add Button, then presses Talk 2. Now an audio stream from Device_1 to Device_3 is initiated. User_3 can hear User 1. Now on Device 1, both Talk_1 and Talk_2 buttons are down, and the corresponding Talk Lights are red. Additionally, the Call Add Light is turned Step 3: User_2 hears a sound alert for an incoming audio stream. User_2 can also see a flashing red light to indicate on which channel the call is coming in. User_2 responds by pressing down Talk 1, now an audio stream from Device_2 to Device 1 is initiated. User 1 can hear User 2.

Step 4: Device 1 mixes User 2's voice with User 1's voice and sends the mixed voices to User 3. Now User 3 can hear User_1 and User_2 due to the audio mixing by Device 1.

Step 5: User_3 hears a sound alert for an incoming audio stream. User_3 can also see a flashing red light to indicate on which channel the call is coming in. User_3 responds by pressing down Talk_1 button, now an audio stream from Device 3 to Device 1 is initiated.

Step 6: Device 1 mixes the voices of User_2 and User_3 and plays it via the speaker. User_1 can hear User_3 in addition to User_2. Additionally, Device_1 mixes User 3's voice with User 1's voice and sends the mixed voices to User 2. audio mix Now User 1,_2, and_3 can all hear each other.

2.11.2. Conference Call Mute and Silence

During an instant conference call, if a participant wants to mute himself, he can press on the Talk Button 108 on his device corresponding to the conference call to release the button. Now this participant can't be heard, but he can still hear everyone else on the conference call. This action is equivalent to pressing the mute button on a traditional phone. For instance, if User_3 presses on Talk 1, he deactivates the audio stream from User 3 to User 1. Now User 3 can't be heard by User_1 or_2. Essentially User_3 muted himself from the conference call.

For User_3 to un-mute himself, User_3 can press down Talk_1 again. Now User_3 can be heard again on the conference call. The question here is: how does the system know that User_3 is part of the original conference call instead of a caller of a new and independent one-way call? The answer lies in the host device, namely Device 1. Device_1 remembers the original conference call structure, and adds User_3 back to the conference call as long as the conference call is still active.

The host device of an instance conference call is responsible for remembering the structure of the conference call until the last participant leaves the conference call. In the case of FIG. 7, Device_1 is responsible for remembering and maintaining the conference call structure.

During an instant conference call, if a participant presses down the Silence Button 110 on his device corresponding to the conference call. The conference call is silenced on the participant's device.

During an instant conference call, there are Talk Buttons that are already down on the host device. If the host presses on a Talk Button 108 that is already down without pressing the Call Add or Drop Button first, then it releases the Talk Button 108. Essentially the host mutes the conference call to the corresponding participant so that the participant can't hear the conference call. To un-mute the conference call to the participant, the host presses down the Talk Button 108 again. Again the host device remembers the conference call structure, and adds the participant back to the conference call.

During an instant conference call, if the host presses down a Silence Button 110 corresponding to a participant, then it silences the participant on the conference call. However, the participant can still listen in on the conference call. For instance, User 1,_2 and_3 are on a conference call and User 1 is the host of the instant conference call. If User_1 presses down Silence_1 on Device 1, then User_1 silences User_2 on the conference call. However, User_2 can still listen in on the conference call.

During an instant conference call, there are Talk Buttons that are already down on the host device. If the host presses down a Talk Button 108 that is currently up without pressing the Call Add Button first, it releases all the Talk Buttons that were down, it also makes all the paired Silence Buttons go down and stay down. Through this action, the host just initiated a new audio stream to a new user. This also causes the conference call to be muted to all participants. This also silences all the participants on the conference call. No one on the conference call can hear each other. Essentially this operation puts the conference call on hold.

During an instant conference call, if a participant instead of the host presses down a Talk Button 108 that is currently up without pressing the Call Add Button first, it releases the down Talk Button 108 corresponding to the conference call, it also makes the paired Silence Button 110 go down and stay down. Through this operation, the participant just initiated a new audio stream to a new user. This also causes this participant to be muted on the conference call, it also silences the conference call to the participant.

2.11.3. Daisy-Chaining of Audio Mixers

After a conference call is initiated by a host, a participant of the conference call (the "second host") can also add a new participant by pressing down the Call Add Button, and then pressing down another Talk Button 108. In this case, the device of the second host acts as a second audio mixer for the incoming voice streams and sends the mixed voices streams out only to the participants that it hosts. Essentially the audio mixers of the first host device and the second host device are daisy-chained to support the conference call co-hosted by the host and the second host. In theory, there is no limit as to how many levels of daisy-chaining the system can support. Practically, with each level of daisy-chaining, the quality of service of the conference call would deteriorate due to increased noise and delay.

Figure 8:
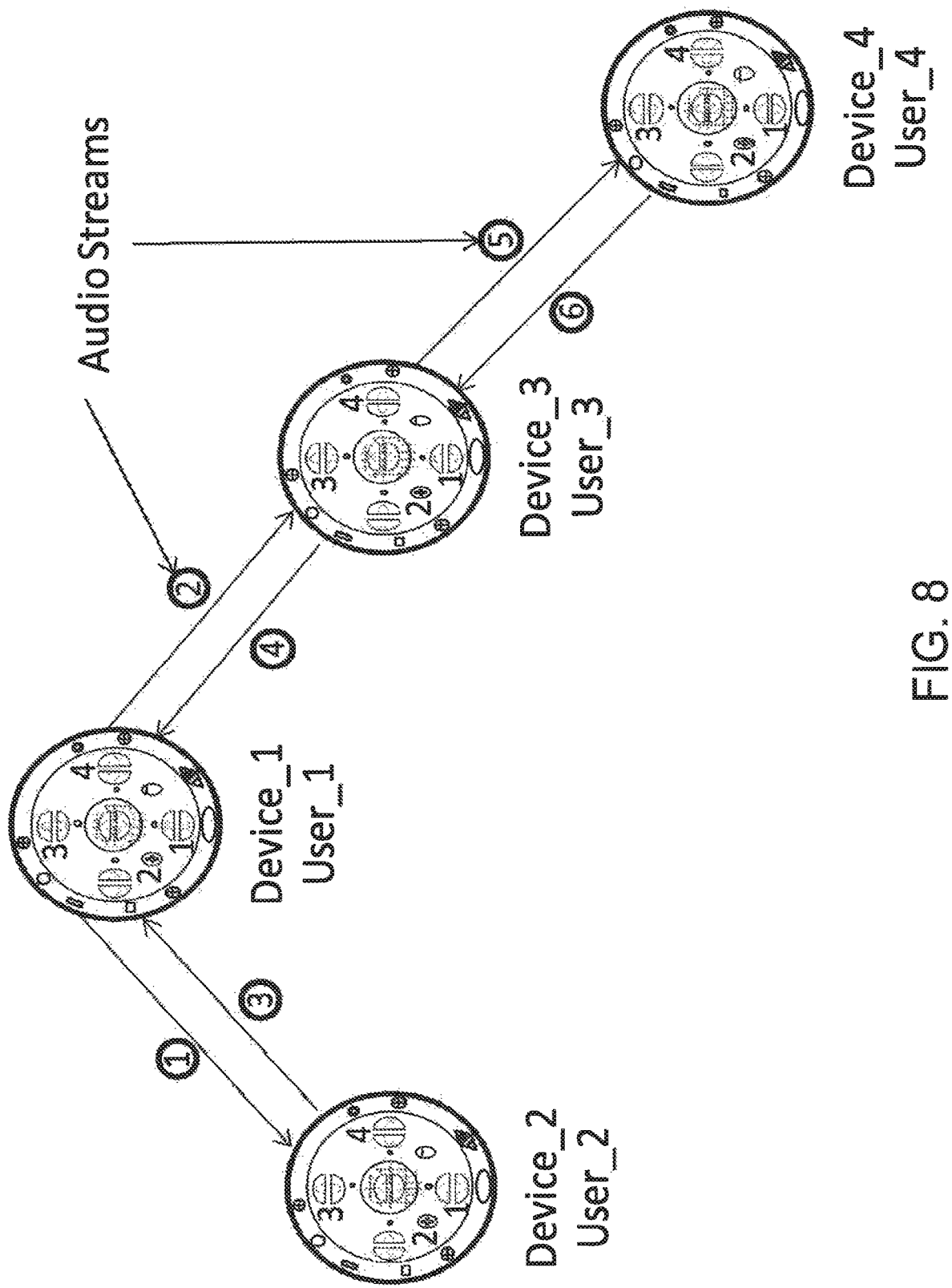
FIG. 8 illustrates an example of a daisy-chained conference call among multiple communication devices according to aspects of this disclosure.

FIG. 8 illustrates an example of a daisy-chained conference call among multiple communication devices according to aspects of this disclosure. In particular, FIG. 8 shows a step-by-step activation process of a daisy-chained conference call.

Step 1 and 2: User_1 initiates an instant conference call with User_2 and_3 by pressing down Talk_1 on Device_1 first, then Call Add Button, and then Talk_2 on Device 1.

Step 3 and 4: User_2 and User_3 respond to the conference call by pressing down Talk_1 on Device_2 and Talk_1 on Device_3, respectively.

Now User 1, 2 and_3 are on a conference call.

Step 5: User_3 now adds User_4 into the conference call by pressing the Call Add Button and then Talk_3 on Device 3.

Step 6: User_4 responds to the conference call by pressing down Talk_3 on Device 4.

Since Device_1 invited Device_2 and Device_3 to the conference call, Device_1 is responsible for providing the audio mixing function to Device_2 and Device_3. Device_1 mixes the incoming audio stream from Device_2 with User 1's voice into a composite audio stream (#2) as shown in FIG. 8 Device_1 then sends the composite Audio Stream #2 to User_3. Similarly, Device_1 mixes the incoming audio stream from Device_3 and User 1's voice into a composite audio stream (#1). Device_1 then sends the composite Audio Stream #1 to User_2.

Device_3 receives the audio stream #2 which contains the voices of User 1 and User 2. Device 3 mixes Audio Stream #2 with User 3's voice into Audio Stream #5 and sends it to Device 4. Device 3 also receives the audio stream #6 which contains User 4's voice. Device 3 mixes Audio Stream #6 with User 3's voice into Audio Stream #4 and sends it to Device 1. Device 3 also mixes Audio Stream #2 and #6, and plays it out via its speaker.

Since Audio Stream #5 contains the voices of User 1, User_2 and User_3, User_4 can hear all parties. Since Audio Stream #1 contains voices from User 1, User_3 and User_4, User_2 can hear all participants and the host.

Through audio mixing, all participants and the host each other. Here is the content of each stream in FIG. 8 for the conference call.

Audio Stream #1: voices of User_1,_3, and_4
Audio Stream #2: voices of User_1 and_2
Audio Stream #3: voices of User_2
Audio Stream #4: voices of User_3 and_4
Audio Stream #5: voices of User_1,_2 and_3
Audio Stream #6: voices User_4

Figure 9:
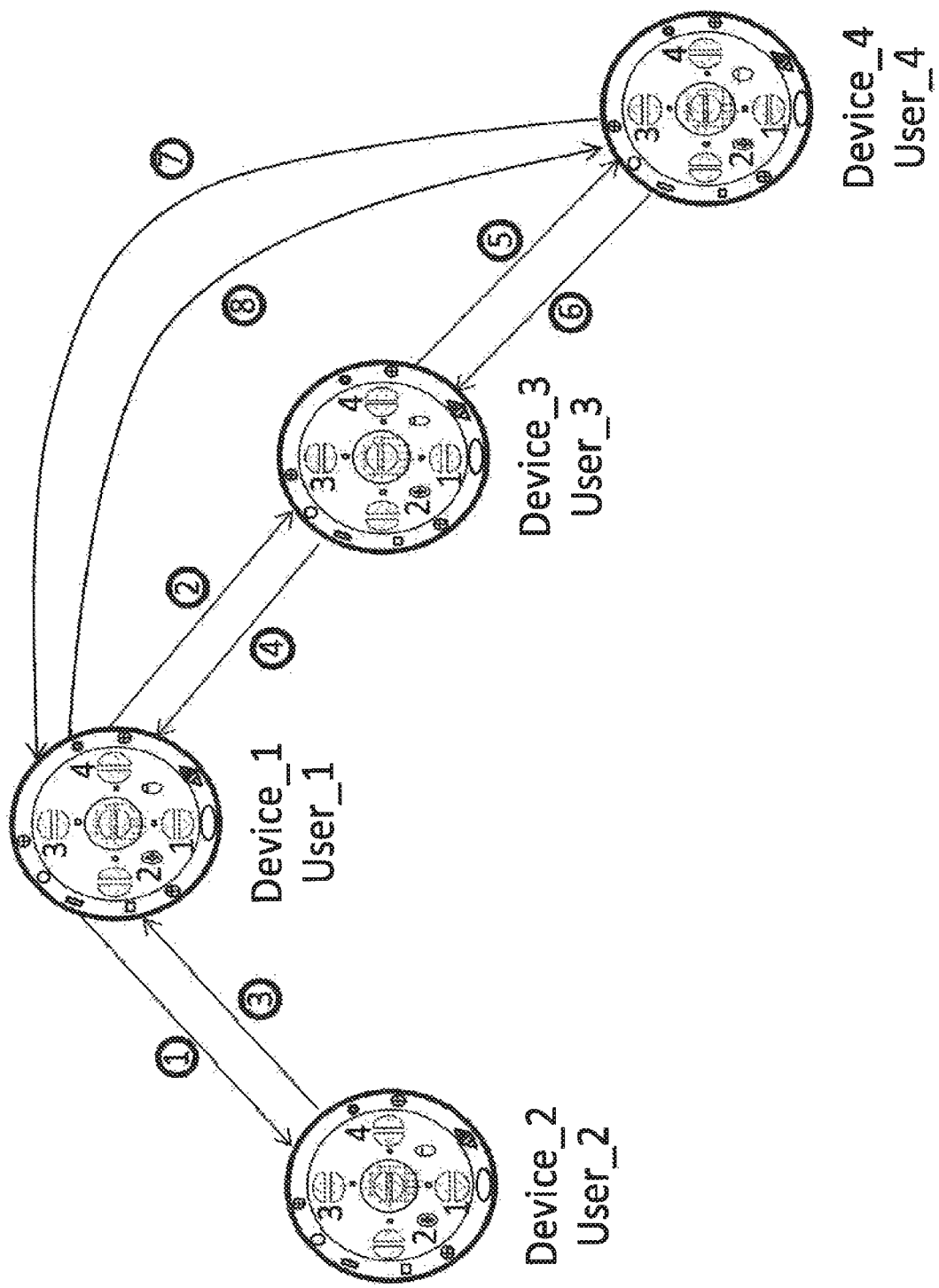
FIG. 9 illustrates a loop that may be formed by multiple connected communication devices according to aspects of this disclosure.

FIG. 9 illustrates a loop that may be formed by multiple connected communication devices according to aspects of this disclosure. In order to prevent loop from forming, a participant can't add the host to the conference call because if the participant presses the Talk Button 108 corresponding to the host, the Talk Button 108 is released. This prevents a direct loop from forming between the host and the participant. Despite this, there is still the possibility of loop forming in an indirect way. For instance, User 1,_2,_3 and_4 are on a conference call as shown in FIG. 9. User_1 is the first host and User 3 is the second host. If User 4 adds User_1 into the conference call, then a loop among User 1,_3 and_4 could potentially be formed. User_1 will see an incoming audio stream coming in on Channel 3. If User_1 presses down Tallk 3, then all the down Talk Buttons will be released and all the pairing Silence Buttons will go down. In this case, Talk_1 and Talk_2 buttons are released. Therefore, the conference call portion hosted by Device_1 is muted to User_2 and User_3. Silence_1 and Silence_2 buttons go down, both User 2 and User 3 are silenced on the conference call portion hosted by Device 1. However, User_1 and User_4 can talk to each other. The audio mixer of Device 3 is still functioning. Since User_4 is the third host, Device_4 acts as a audio mixer for the incoming stream. Device_4 mixes Audio Stream #5 (note User 1's voice and User 2's voice are not present) with User_4's voice, and sends it to User 1. Device_4 also mixes stream #8 (User 1's voice) with User_4's voice, and sends it to User_3. Essentially Device 3,_4 and Device_1 are having a conference call hosted by Device_4.

Here is the content of each stream in FIG. 9 for loop forming.

Audio Stream #1: no voice
Audio Stream #2: no voice
Audio Stream #3: voice of User_2 (silenced by Device 1)
Audio Stream #4: voices of User_3,_4 and 1 (silenced by Device 1)
Audio Stream #5: voices of User_3
Audio Stream #6: voice of User_4 and User_1
Audio Stream #7: voices of User_3 and 4
Audio Stream #8: voice of User_1

User_4 can hear User_1 and_3. User_3 can hear User_4 and User 1. User_1 can hear User_4 and_3. Essentially a conference call among User 1, User_3 and User_4 is initiate initiated and is hosted by Device_4. A potential loop is avoided in this case.

If a loop forms during a conference call, it can be confusing to participants. One way to handle it is to let the participants handle it. They can try to sort it out by dropping the participant that caused the loop. Or they can terminate the conference call entirely and restart the conference call.

If there are multiple hosts for a conference call, when one host drops a participant who is a second host for other participants ("the second participants"), then the second host and the second participants are dropped from the conference call portion hosted by the first host. However, the second host and the second participants can continue with the conference call amongst themselves.

Figure 10:
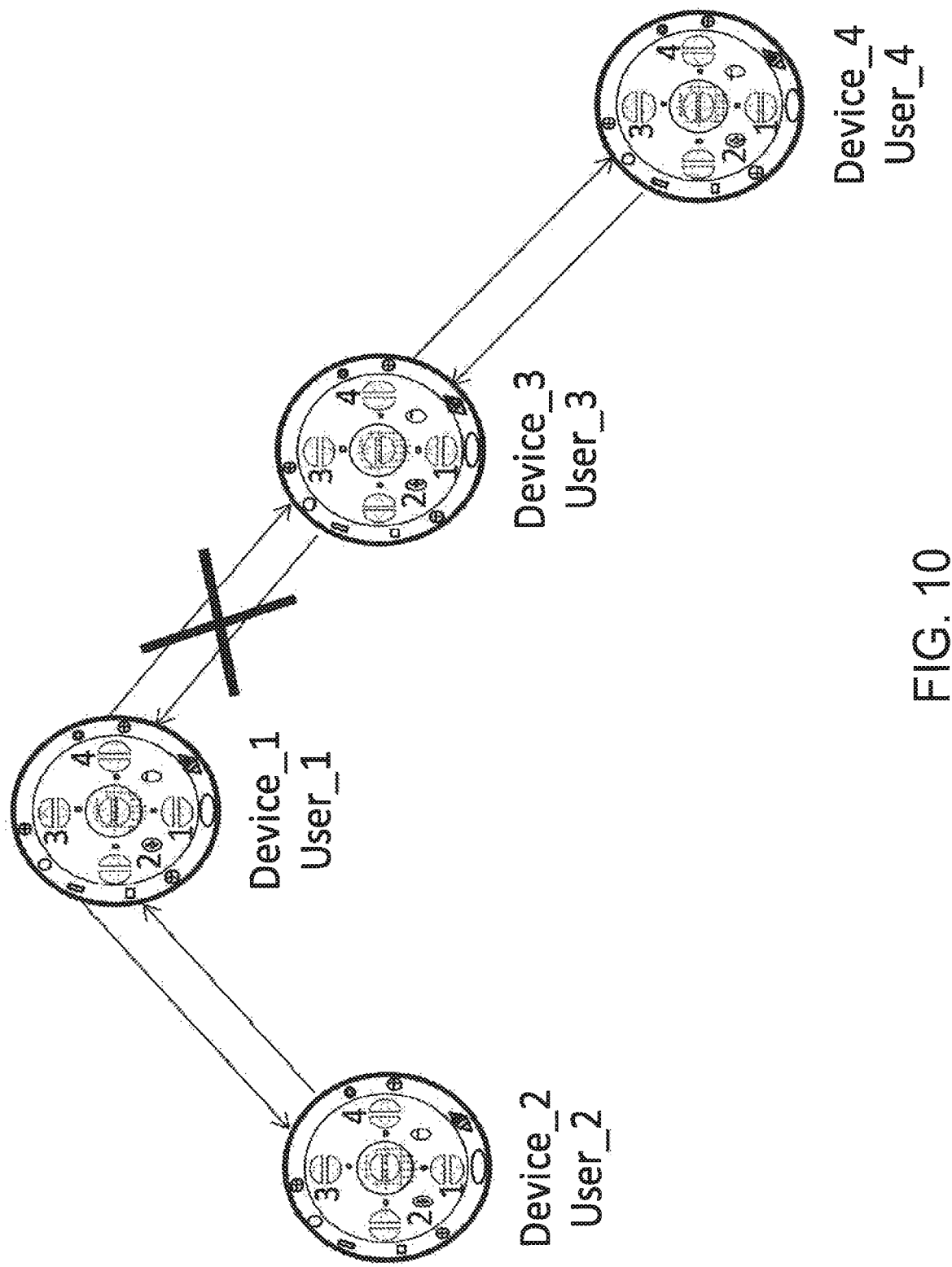
FIG. 10 illustrates an example of dropping a second host from a conference call according to aspects of this disclosure.

FIG. 10 illustrates an example of dropping a second host from a conference call according to aspects of this disclosure. After User_3 is dropped from the original conference call from FIG. 8, User_3 and User 4 are still on a call between themselves. Note that the host can only drop the portion of the conference call that he started, but he can't drop the portion that was started by another host.

2.12. Sending and Receiving Voicemail

A Voicemail Light on a device flashes red as soon as a voice message arrives. If the user of the device presses the Voicemail button, then he will start hearing the voicemail messages with the newly recorded message being played first. The Voicemail button doesn't stay down when pressed. Before each message is played, the device will announce the channel from which the message came in on. Pressing the Voicemail button again, the user skips from the current message to the next message. Voicemail messages are automatically deleted after they are listened to even if the user doesn't finish listening to the message.

Figure 11:
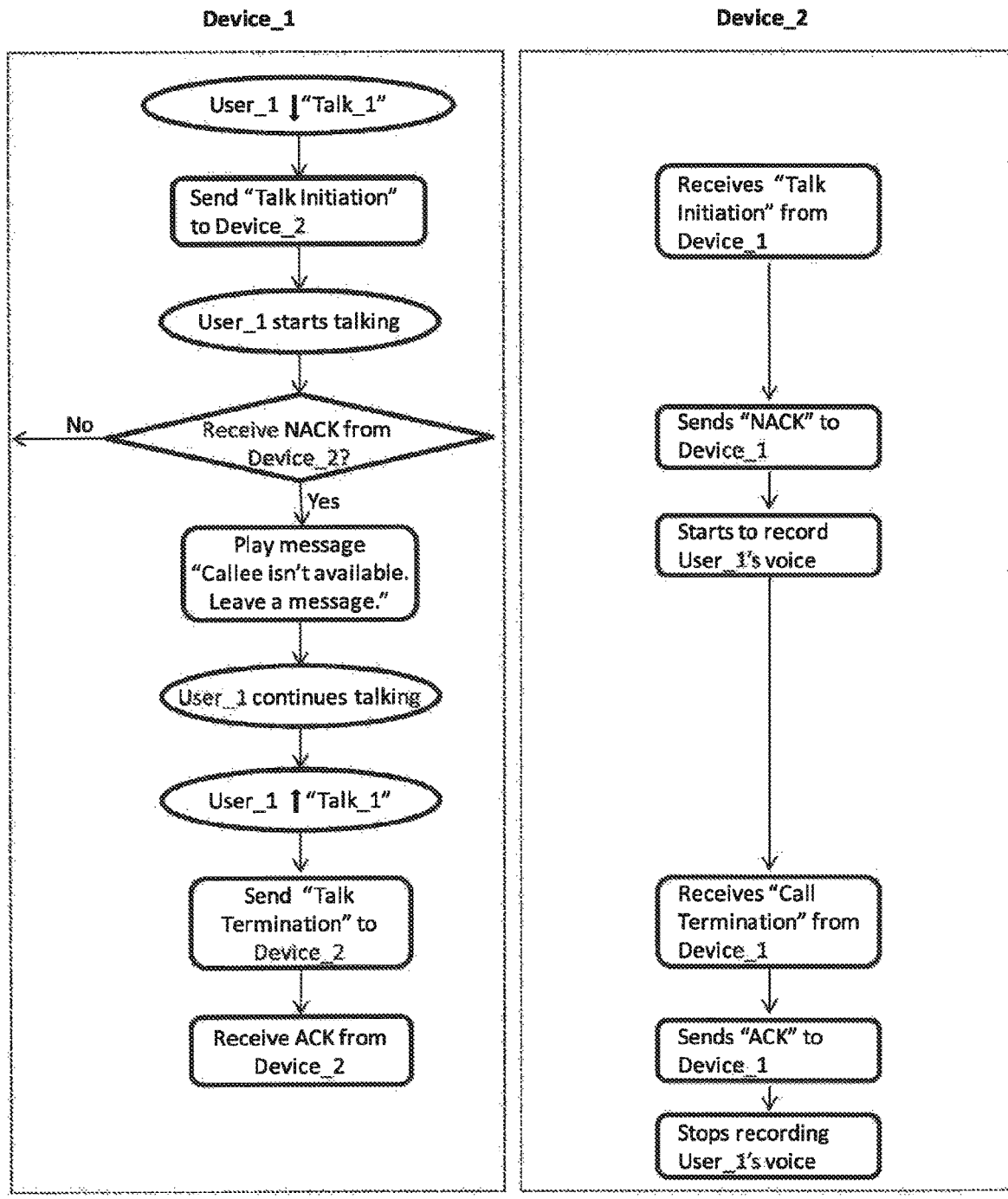
FIG. 11 illustrates logic flow for recording a voicemail according to aspects of this disclosure.

In order to save a voicemail message, the user can press the Voicemail button twice quickly, this will save the current message and skip to the next message. FIG. 11 illustrates logic flow for recording a voicemail according to aspects of this disclosure.

In FIG. 11, User_1 presses down Talk_1 button. According to FIG. 6, Talk_1 corresponds to a channel connected to Device 2. Device 1 sends a "Talk Initiation" message to Device 2. Upon receiving "Talk Initiation", the Channel Light on Device_2 corresponding to the incoming audio stream flashes red light. Device_2 sends a NACK message to Device_1 to indicate that Device_2 is busy or unavailable. If there is at least one active channel on Device_2, then Device_2 is busy. An active channel may have an incoming audio stream, outgoing audio stream, or both. If either a Silence Button 110 or a Talk Button 108 or both are down on Device_2, then Device_2 is unavailable. Alternatively if User_2 is listening on a channel, then Device 2 is unavailable. After sending the NACK message, Device_2 also starts to record User 1's voice. Upon receiving an NACK, Device_1 plays a message like "Callee isn't available, please leave a message." User_1 continues talking to leave a message. User_1 presses Talk_1 to release the button. Device_1 sends a Talk Termination message to Device_2. Device_2 then sends an ACK and stops recording User 1's voice.

2.13. Sending and Receiving Streaming Web Content

The sender can log into his account on a website through the Internet. In his account, there is a calendar. The sender can specify a specific time for the streaming content to be delivered. He also specifies the sender's name and the recipient's Device Name(s). There might be one or multiple recipients. The recipients may have given permission to receive streaming web content. The streaming content can be the recorded voice of the user or a song or a combination of various audio contents. The website is hosted by a web server as part of the Instant Communications System.

The streaming content is stored on the Media Server. The Media Server can be a third party server. Additionally, the Media Server has its own streaming contents from which a user can select from (e.g., radio stations, pod cast).

When the scheduled time arrives, the Media Server will send the streaming content the recipient's device. The recipient's device will play the stream content on the channel of the sender's device. The recipient's device will play the streaming content immediately if the Silence Button 110 for the sender isn't down and the speaker isn't busy.

This feature could also be used as a reminder or an alarm. A user can pre-program some streaming content (e.g., voice message or music) to serve as a reminder or an alarm.

Streaming content playing on a device has a lower priority. It is preempted by user activities. For instance, when an incoming audio stream comes into the device, it preempts the streaming content. Or if a user presses the Talk Button 108, it preempts the streaming content. Or if a user presses the voicemail message button, it preempts the streaming content.

2.14. IP Packets

There are two types of IP packets in the call flows:

Signaling Messages

Signaling messages include Talk Initiation, Talk Termination, Call Add, Call Drop, ACK, NACK, Request IP Address, Return IP Address, Add Connection, Add Connection Accepted, etc.

Signaling messages can use either TCP/IP or UDP/IP protocol.

In each signaling message sent by a device to another device, there contain the Device Names of the sender and the receiver. In each message sent by a device to the Instant Voice Server, there contain the hardware ID and the Device Name of the sender. In each message sent by the Instant Voice Server to a device, there contain the hardware ID and the Device Name of the receiver.

Bearer Traffic Packets

Bearer traffic packets carrying multimedia content including audio and video typically use UDP/IP protocol.

Each bearer traffic packet may be time stamped with the accuracy on the order of millisecond by the device generating the packets. The timestamps will be used to sort packets that are out of order and to discard late packets.

Additionally, all signaling messages and bearer traffic packets are encrypted to protect the privacy of users and the content of communications.

3. Configuring Devices

Figure 12:
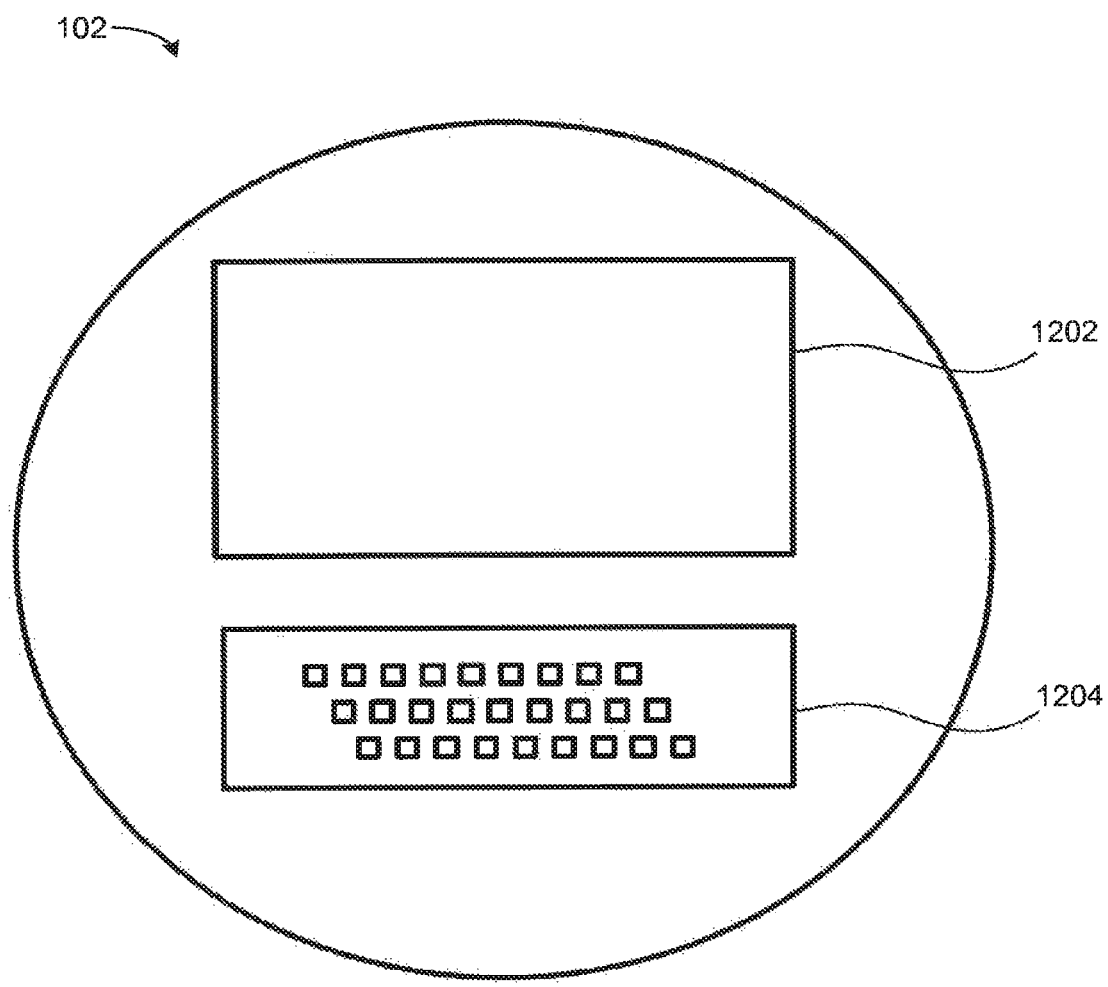
FIG. 12 illustrates a bottom-up view of the communication device according to aspects of this disclosure.

FIG. 12 illustrates a bottom-up view of the communication device according to aspects of this disclosure. A device 102 may or may not have a screen 1202 or data entry mechanism 1204 (e.g., a keyboard). If the device has a screen 1202 and a data entry mechanism 1204 as shown in FIG. 12, then configuration of the device can be done through these interfaces.

Where a device does not have a display 1202 and a data entry mechanism 1204, then the configuration may be done through a configuration machine such as PC, a laptop, a tablet, or a smartphone that has a display and data entry mechanism. The configuration machine is connected to the device locally either via a cable (e.g., a USB cable) or via a wireless connection (e.g., infrared). The configuration machine needs to have the configuration software installed on the machine to manage the device. The software can be downloaded from the Internet or an application store, or copied from a disk. Once the configuration machine and the device are connected and the configuration software running, a user can configure the device via the configuration machine. After a device establishes connection with the Instant Communications Server, the device can be configured via a web site provided by the Instant Communications Server.

In the case where the device doesn't have a screen display, there needs to be an Event Indicator that tells the user that there is an incoming event that needs to be handled. For instance, if the device receives a request to connect from another user, the Event Indicator will turn on. The user will then know to handle the request through one of the three ways to configure the device.

3.1. Configuring Connectivity

Two or more devices are typically sold as a package. After plugging in the power, the user first needs to connect the devices to the network. For instance, if there is a WiFi network, then the user will select the Access Point ID and enter the WEP key on each of those devices. The configuration interface will indicate that the WiFi Connection is successful.

Each device is pre-configured to connect with the Instant Communications Server as soon as it establishes a Internet connection. For instance, each device is pre-configured to contact a certain Universal Resource Locator (URL) or a certain IP address where the Instant Communications Server is located. If the connection from the device to the Instant Communications Server is successful, then the Connectivity Light 126 will turn green. At this point, the Instant Communications Server has obtained the device's IP address. Since this is a portable device, the IP address of the device may change from time to time and the device will update the Instant Communications Server with the new IP address.

There is a special case where the Instant Communications Server is not available for various reasons. One reason could be that the devices reside on a LAN that isn't connected to the Internet. Therefore this group of devices can't connect to the Instant Communications Server. In this case, the system may still allow the devices on the same LAN to communicate with each other in the absence of the Instant Communications Server. The devices on the same LAN needs to discover each other and establish connectivity with each other.

3.2. Naming of Devices

Each device has a globally unique hardware ID that is hardwired in the device by the manufacturer. The hardware ID uniquely identifies the device.

Each device may have a globally unique name configured by a user and approved by the system. This unique name is called the Device Name. Associated with the Device Name is the password. A user might label his device with a Device Name representing a person or a location. Depending on the application, the Device Name of a device might be person's name, such as John. Alternatively, if the device is distributed in a big house and functions like an intercom system, then the Device Name for the device might be "Living Room".

The Device Name and password may be configured for the device. This may bind the hardware ID with the Device Name. The Device Name and password, along with the device's hardware ID and IP address are sent to the Instant Communications Server The Instant Communications Server grants the selection of Device Name and password, and the binding of Device Name with the hardware ID.

Figure 13:
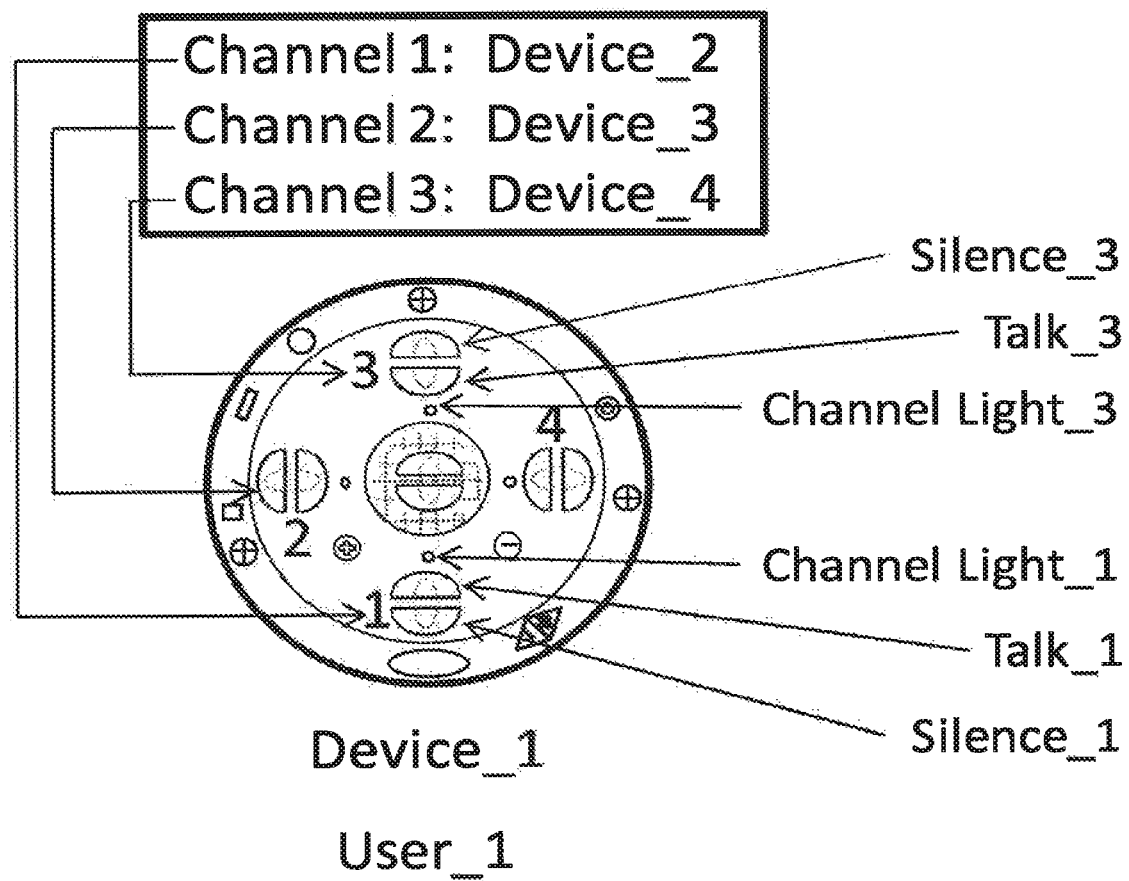
FIG. 13 illustrates another example of configuring the channels of the communication device according to aspects of this disclosure.

The Instant Communications Server maintains the information of all the devices, such information includes hardware ID, the Device Name and password, the IP address of the device, network configuration parameters, and channel configuration. FIG. 13 shows an example of the configuration.

A user may be an administrator of multiple devices. The user can create a globally unique User Name for all the devices that he manages. The User Name is used as a login name for the user's account accessed via the web site provided by the Instant Communications Server. Associated with the User Name is the password. Once logged in, the user can manage multiple devices under one account via the Internet if these devices are already configured to connect the Instant Communications Server.

Once a device is configured with a Device Name, the hardware ID of the device is bound with the Device Name. A user can change the Device Name of a device to another Device Name. The device will update the Instant Communications Server with the new Device Name.

3.3. Channel Configuration

The next step is to configure each device to connect to other devices. The connection to another device is called a channel. FIG. 13 illustrates an example of configuring the channel of the communication device according to aspects of this disclosure. For instance, in FIG. 13, a user can configure each channel on a device in the following way.

The device in FIG. 13 is called Device 1. The user of the device is called User 1. In further detail, Channel 1 on Device 1 refers to the connection with Device 2 whose user is User 2. Channel 2 on Device 1 refers to the connection with Device 3 whose user is User 3. Channel 3 on Device 1 refers to the connection with Device 3 whose user is User 4. Corresponding to Channel 1, there are Talk_1 and Silence_1 buttons, and Channel Light 1. If the connections with Device 2,_3 and_4 are good, then Channel Light 1,_2 and_3 on Device_1 are green. Note that Channel 4 is not configured, therefore Channel Light_1 is dark.

3.4. Remote Configuration

Once a device connects to the Instant Communications Server, then the device can be configured remotely via the Internet by logging in with the User Name and password combination. A user can remotely add wireless connections such as a new WiFi access point. A user can configure channels as well. A user can also accept or reject a request to add another user.

3.5. Channel Establishment

Figure 14:
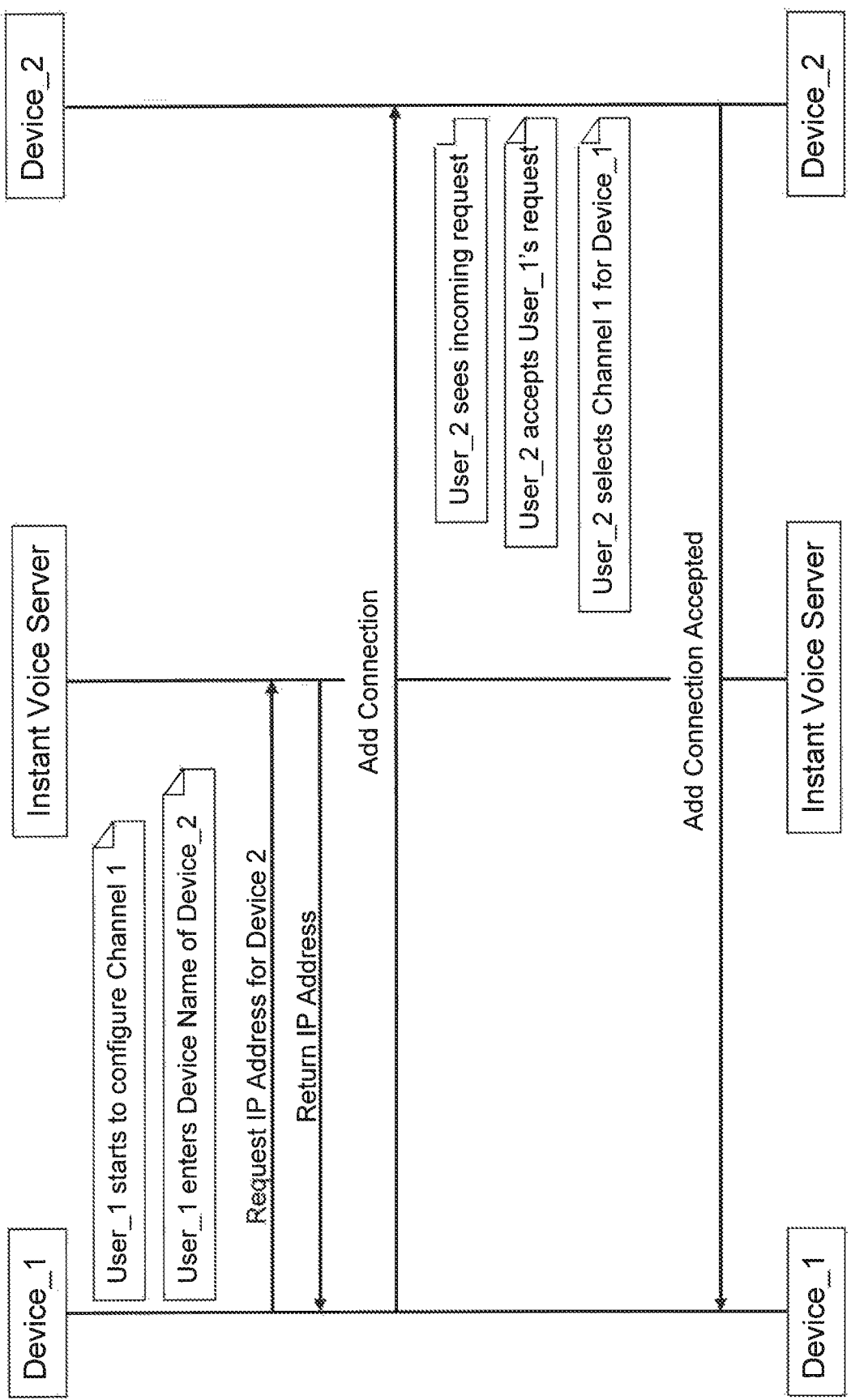
FIG. 14 illustrates an exemplary call flow for adding a channel to the communication device according to aspects of this disclosure.

FIG. 14 illustrates an exemplary call flow for establishing a channel between two devices according to aspects of this disclosure. Referring to FIG. 14, User_1 configures Channel 1 to correspond to Device_2 by entering the Device Name "Device 2".

Device_1 then sends a "Request for IP Address for Device_2" message to the Instant Communications Server. The Instant Communications Server returns with an IP address for Device_2. Device_1 then sends an "Add Connection" message to Device_2 using Device 2's IP address as destination. The message also includes the Device Name "Device_2" as the destination device, and the Device Name "Device 1" as the source device. User_2 of Device_2 can accept or deny the request. User_2 can also block any further requests from the user. If User_2 accepts the request, Device_2 sends an "Add Connection Accepted" message back to Device 1. Additionally, User_2 needs to select a channel that corresponds to Device 1. Now Device_1 and Device_2 are connected and are configured on each other's devices. Channel Light_1 on Device_1 and Channel Light_1 on Device_2 both turn green. After the channel is established, both devices can identify each other by the device names and know how to communicate with each other by knowing the IP addresses of each other. Additionally, on a device, the connected device is mapped to a specific channel. Each channel on the device has a channel identifier. All of this configuration information including channel identifier, device name corresponding to the channel, and the IP address corresponding to the connected device is stored at the device.

When the user finishes configuring all the devices, FIG. 6 shows an example of the mapping between channels and devices among multiple connected devices.

For safety reasons, the call flow for adding a channel can be altered so that the IP Address of Device 2 is not sent to Device_1 because Device_1 isn't approved yet by User_2 of Device_2. In this case, the Instant Communications Server acts as an intermediary. The Instant Communications Server will not return with an IP address for Device 2. Device_1 sends an "Add Connection" message to the Instant Communications Server instead. The Instant Communications Server forwards the message to Device_2. If User_2 accepts the request, Device_2 sends an "Add Connection Accepted" message back to the Instant Communications Server which forwards the message to Device 1. Now Device_1 and Device_2 are connected and configured on each other's devices. After Device_1 is accepted by Device_2, the Instant Communications Server will return the IP address of Device_2 when requested.

Similarly, when a user of a first device wants to remove a connection with a second device, the user can reconfigure the corresponding channel to None (no one), or to a third device. And the user's device sends a "Drop Connection" message to the second device. The second device responds with a confirmation to the first device. Now the corresponding Channel Lights on both the first and the second devices go dark.

3.6. Device Information Collection

A device will update the Instant Communications Server with the following information on a periodic basis:

Device Name and password

Channel configurations

Network connectivity parameters (e.g., WiFi Access Point ID and WEP key)

4. Call Flows of Instance Voice Functions

The following use cases assume that Device 1, Device_2, Device_3 and Device_4 are configured as shown in FIG. 6. The configuration information is stored in the memory of each device. Furthermore, each device is connected to the other three devices.

Figure 15:
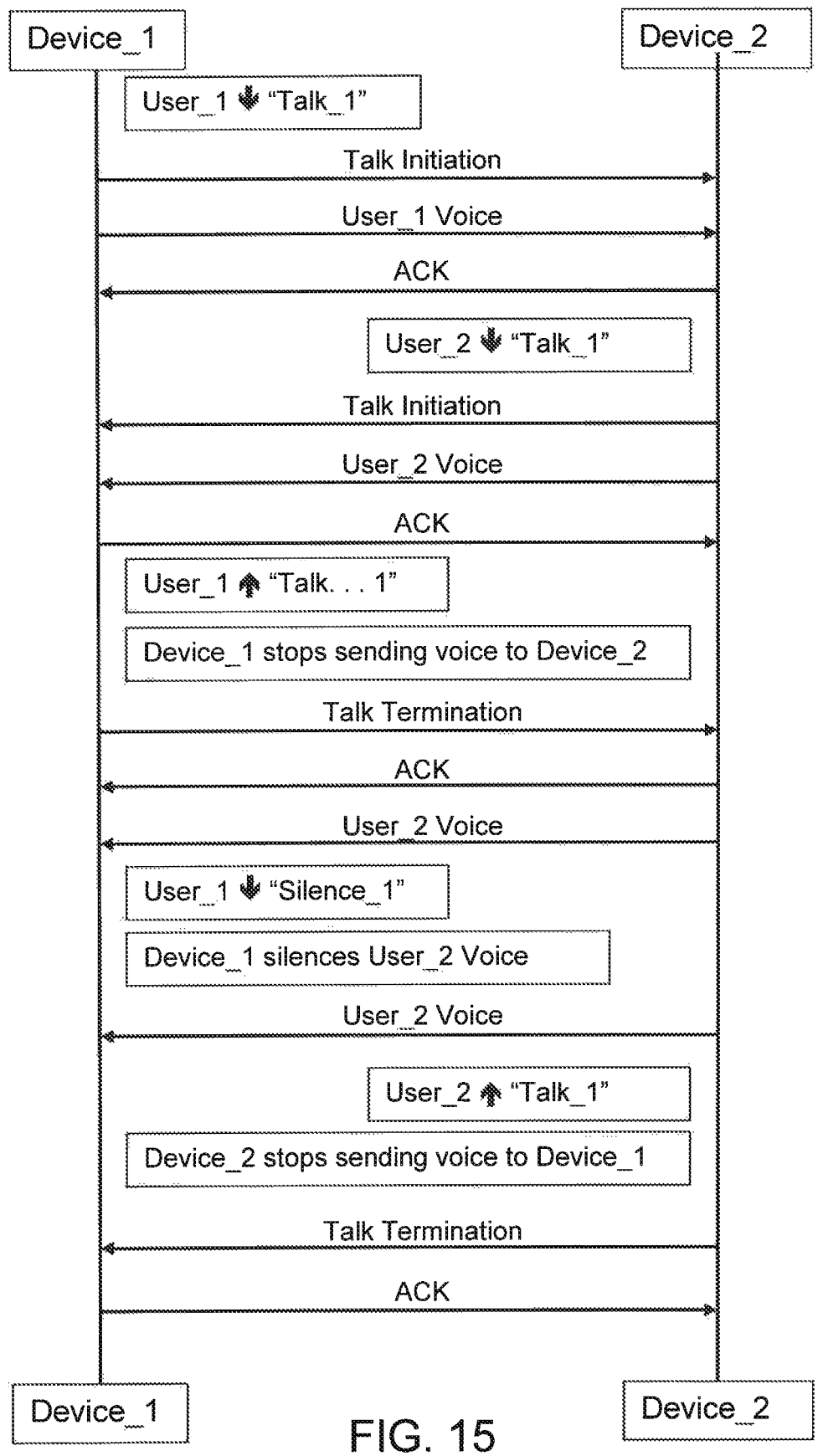
FIG. 15 illustrates an exemplary call flow for talk initiation and talk termination according to aspects of this disclosure.

FIG. 15 illustrates an exemplary call flow for talk initiation and talk termination according to aspects of this disclosure. Referring to FIG. 15, User_1 presses down Talk_1 button. The processor of Device_1 maps Talk_1 to Device_2 based on the configuration information stored in memory. Additionally the processor maps Device_2 to its IP address. Using the IP address of the Device_2 as an IP packet destination, Device_1 sends a Talk Initiation message to Device_2. Device_1 starts sending User 1's voice in the form of IP packets to Device_2. Device_2 acknowledges the receipt of the message.

Device_2 plays a sound alert to indicate the incoming audio stream from User 1. Device_2 receives User 1's audio stream and plays User 1's voice stream on the speaker. Additionally, Channel Light_1 on Device_2 flashes red light to indicate the incoming audio stream from User_1 on Channel 1. Now User_2 can hear User_1 without taking any action.

User_2 presses Talk_1 button next to the flashing red light. The processor of Device_2 maps Talk_1 to Device_1 based on the configuration information stored in memory. Using the IP address it just received in the IP packet, Device_2 sends a Talk Initiation message to Device 1. Device_2 starts sending User_2's voice in the form of IP packets to Device 1. Device_1 acknowledges the receipt of the message. Device_1 plays a sound alert to indicate the incoming audio stream from User_2. Device_1 receives User_2's audio stream and plays User_2's voice on the speaker. Additionally, Channel Light_1 on Device_1 and Device_2 turn red. Now User_1 can hear User_2.

The Talk Initiation message may include one or more of the following information: message type, source device name, destination device name, audio encoding format, video encoding format, rich text format, encryption information, etc. The Talk Initiation message may be one type of initiation message transmitted by the communication device. Depending on the type of content being transmitted, the communication device may transmit other types of initiation messages, such as a Video Initiation message, Music Initiation message, or other types of initiation messages. In this manner, the initiation message transmitted by the communication device may inform the receiving communication device of the type of information the receiving communication device should expect.

The IP packets of an audio stream may include source and destination device names in addition to digitized audio content. The IP packets may be encrypted for security and privacy reasons.

User_1 wants to mute himself on the call. User_1 releases the Talk_1 button by pressing on it again. Device_1 stops recording User 1's voice and stops sending User 1's audio stream to Device_2. Additionally, Device_1 sends a Talk Termination message to Device_2. Device_2 acknowledges the receipt of the message and stops processing the audio stream from Device 1. A sound alert for the Talk Termination is played by Device_2. Channel Light_1 on Device_2 turns green. Channel Light_1 on Device_1 turns flashing red. Now User_2 can't hear User 1.

Note that User_1 can still hear User_2. In order to silence User_2, User_1 presses down Silence_1 button. Device_1 stops playing User_2's voice on the speaker.

In addition, note that the Talk_1 button on Device_2 is still down. At some point, User_2 will release the Talk_1 button by pressing on it again. Device_2 stops recording User_2's voice and stops sending User_2's audio stream to Device 1. Additionally, Device_2 sends a Talk Termination message to Device 1. Device_1 acknowledges the receipt of the message. A sound alert for the Talk Termination is played by Device 1. However, since the Silence Button 110 is down, the sound alert is suppressed. Channel Light_1 on Device_1 turns green.

Note that after the Talk Initiation message was sent from Device_1 to Device_2, Device_1 doesn't wait for ACK to come back from Device_2 before sending out User 1's audio stream. User 1's audio stream can be sent immediately after the Talk Initiation message was sent. This is an important aspect of the system. In the past, an end-to-end connection needs to be set up via signaling for both the circuit and packet voice before anyone's voice is transmitted. At the end of the conversation, the connection has to be torn down. As the disclosed systems and methods bypass all of these set up and tear down procedures at the time when a user initiates communications with another user, the disclosed systems and methods effectively provide instant communications.

Figure 16:
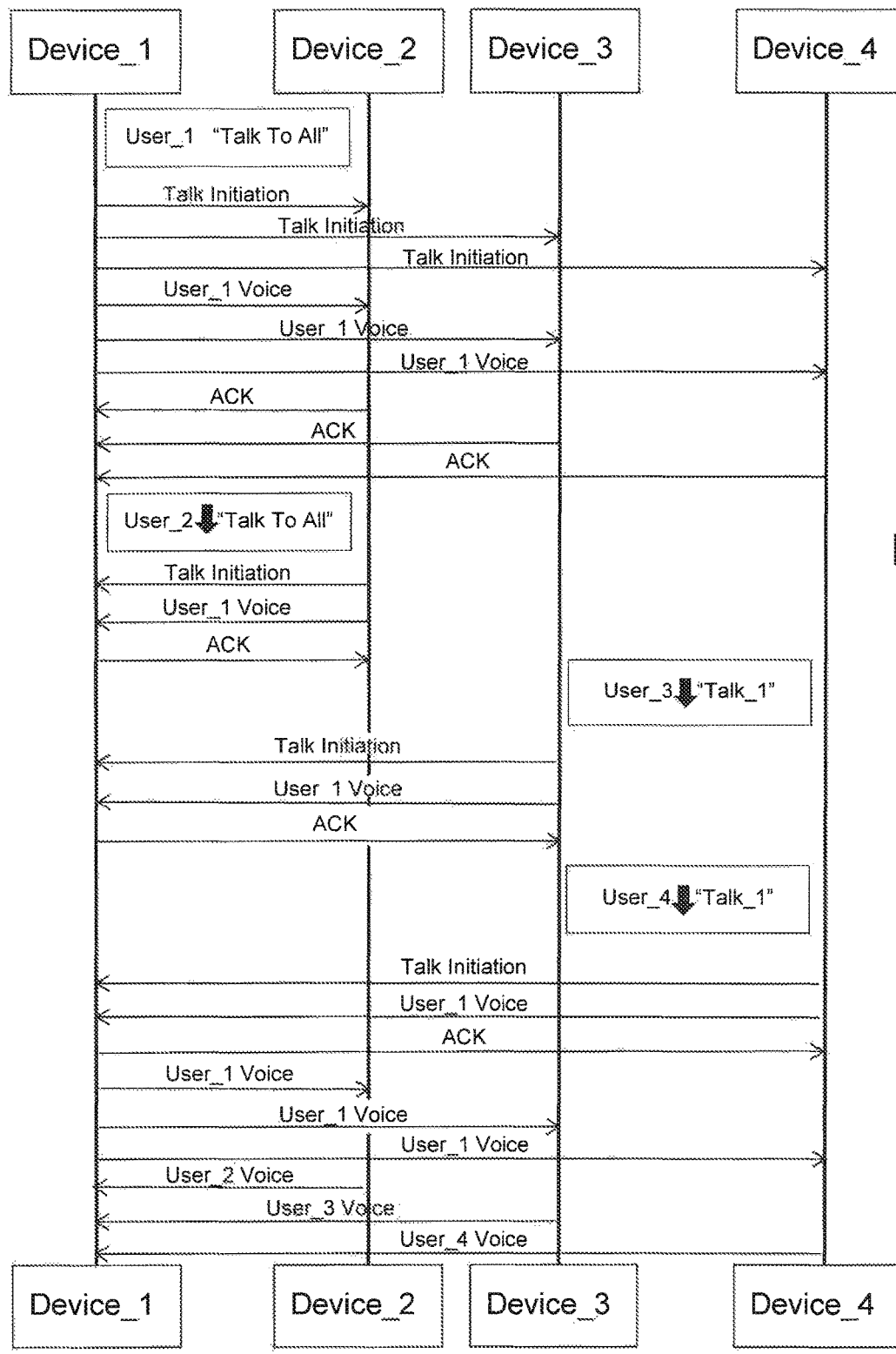
FIG. 16 illustrates an exemplary call flow for broadcasting a call according to aspects of this disclosure.

FIG. 16 illustrates an exemplary call flow for broadcasting a call according to aspects of this disclosure. In FIG. 16, User_1 presses the Talk to All Button 112. Since Talk to All on Device_1 corresponds to all the connected devices, Device_1 sends Talk Initiation messages to Device_2, Device_3 and Device_4. Device_1 starts sending User 1's voice in the form of IP packets to Device_2, Device_3 and Device_4. Device_2, Device_3 and Device_4 acknowledge the receipt of the messages. Device_2, _3 and _4 play a sound alert to indicate the incoming audio stream from User 1. Device_2, Device_3 and Device_4 receive User 1's audio stream and play User 1's voice on the speakers. Additionally, Channel Light_1 on Device_2, Channel Light_1 on Device_3 and Channel Light 1 on Device 4 flash red light to indicate the incoming audio stream from User_1 on Channel 1. With audio mixing, now User_2, _3 and _4 can hear User 1.

User_2 presses Talk_1 button. Device_2 sends a Talk Initiation message to Device 1. Device_2 starts sending User_2's voice in the form of IP packets to Device 1. Device_1 acknowledges the receipt of the message. Device_1 plays a sound alert to indicate the incoming audio stream from User_2. Channel Light_1 on Device_1 and Device_2 turn red. Device_1 receives User_2's audio stream and plays User_2's voice on the speaker. Now User_1 can hear User_2.

User_3 presses Talk_1 button. Device_3 sends a Talk Initiation message to Device 1. Device_3 starts sending User 3's voice in the form of IP packets to Device 1. Device_1 acknowledges the receipt of the message. Device_1 plays a sound alert to indicate the incoming audio stream from User_3. Channel Light_2 on Device_1 and Channel Light_1 on Device 3 turn red. Device 1 receives User 3's audio stream. Note that Device 1 also receives User 2's voice. Device 1 mixes the voices of User_2 and User_3, and plays the mixed voices on the speaker. Now User_1 can hear both User_2 and User 3. But User 2 and User 3 can't hear each other.

User_4 presses Talk_1 button. Device_4 sends a Talk Initiation message to Device 1. Device_4 starts sending User 4's voice in the form of IP packets to Device 1. Device_1 acknowledges the receipt of the message. Device_1 plays a sound alert to indicate the incoming audio stream from User_4. Channel Light_3 on Device_1 and Channel Light_1 on Device 4 turn red. Device 1 receives User 4's voice. Note that Device 1 also receives User 2's and User 3's voices. Device_1 mixes the voices of User_2, User_3 and User_4, and plays the mixed voices on the speaker. Now User_1 can hear User_2, User_3 and User_4. But User_2, User_3 and User_4 can't hear each other.

Essentially, User_1 is having separate conversations with User_2, _3 and _4 simultaneously.

Figure 17:
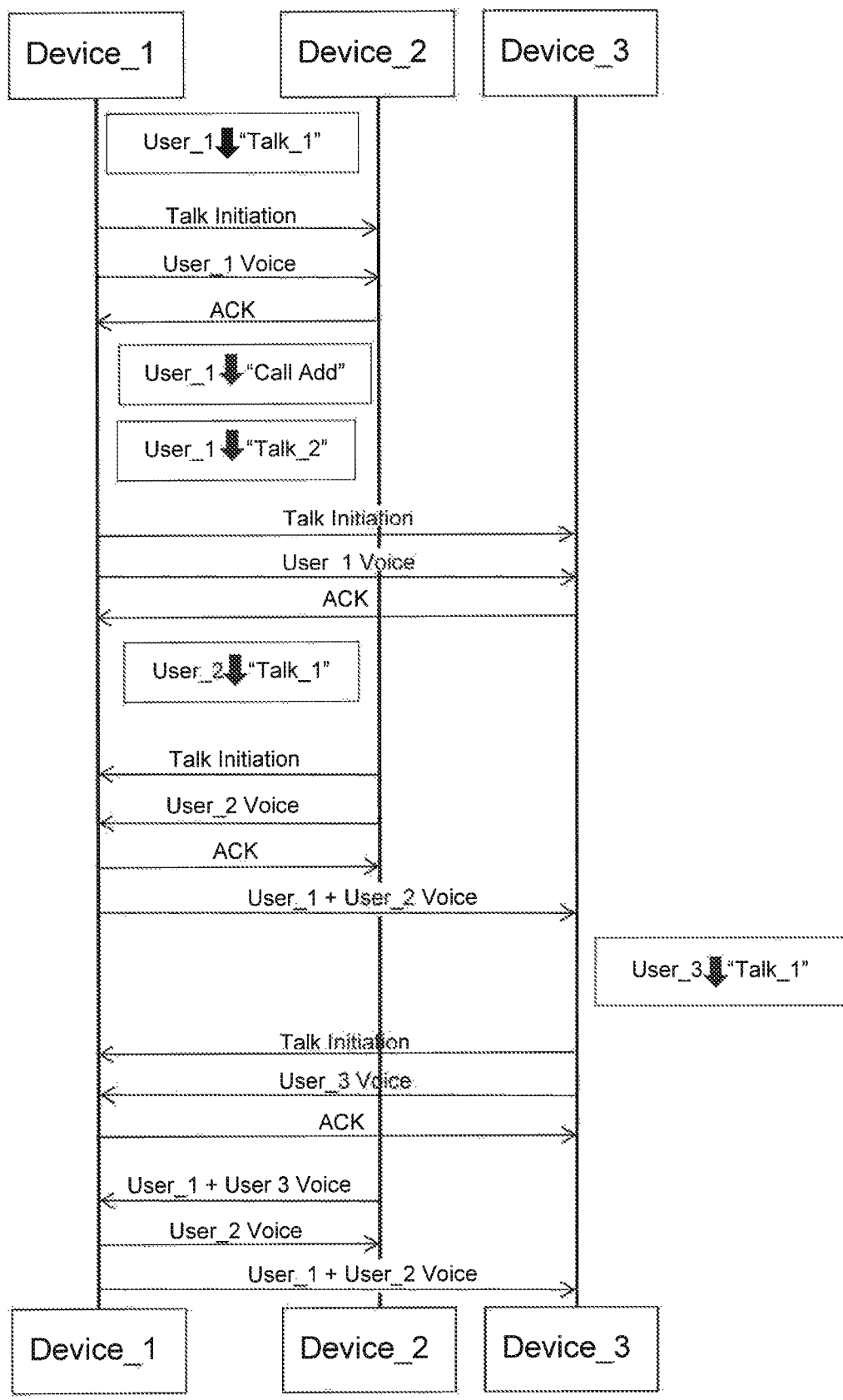
FIG. 17 illustrates an exemplary call flow for a conference call activation according to aspects of this disclosure.

FIG. 17 illustrates an exemplary call flow for a conference call activation according to aspects of this disclosure. In FIG. 17, User_1 presses Talk_1 button. Since Talk_1 on Device_1 corresponds to Device_2 as indicated by FIG. 6, Device_1 sends a Talk Initiation message to Device_2. Device_1 starts sending User 1's voice in the form of IP packets to Device_2. Device_2 acknowledges the receipt of the message. Device_2 plays a sound alert to indicate the incoming audio stream from User 1. Device_2 receives User 1's audio stream and plays User 1's voice on the speaker. Additionally, Channel Light_1 on Device_2 flashes red light to indicate the incoming audio stream from User_1 on Channel 1. Now User_2 can hear User 1.

User_1 presses the Call Add Button. Then User_1 presses Talk_2 button. Since Talk_2 on Device_1 corresponds to Device_3 as indicated by FIG. 6, Device_1 sends a Talk Initiation message to Device_3. Device_1 starts sending User 1's voice in the form of IP packets to Device_3. Device_3 acknowledges the receipt of the message. Device_3 plays a sound alert to indicate the incoming audio stream from User 1. Device_3 receives User 1's audio stream and plays User 1's voice on the speaker. Additionally, Channel Light_1 on Device_3 flashes red light to indicate the incoming audio stream from User_1 on Channel 1. Now User_3 can hear User 1.

User_2 presses Talk_1 button. Device_2 sends a Talk Initiation message to Device 1. Device_2 starts sending User_2's audio stream in the form of IP packets to Device 1. Device_1 acknowledges the receipt of the message. Device_1 plays a sound alert to indicate the incoming audio stream from User_2. Device_1 receives User_2's audio stream and plays User_2's voice on the speaker. Additionally, Channel Light_1 on Device 1 and Device 2 turn red. Now User 1 can hear User_2.

Since Device_1 is the host of the conference call, it mixes the incoming voices and sending the mixed voices to each participant. In this case, Device_1 mixes the voices of User_1 and User_2, and sends the mixed voices to Device_3. Now User_3 can hear User_1 and User_2.

User_3 presses Talk_1 button. Device_3 sends a Talk Initiation message to Device 1. Device_3 starts sending User 3's audio stream in the form of IP packets to Device 1. Device_1 acknowledges the receipt of the message. Device_1 plays a sound alert to indicate the incoming audio stream from User 3. Device 1 receives User 3's audio stream. Note that Device 1 also receives User 2's voice. Device 1 mixes the voices of User_2 and User_3, and plays the mixed voices on the speaker of Device 1. Now User_1 can hear both User_2 and User_3. Additionally, Channel Light_1 on Device_1 and Device 3 turn red.

Additionally, Device_1 mixes the voices of User_1 and User_3, and sends the mixed voices to Device_2. Now User_2 can hear User_1 and User_3.

Now User 1, User_2 and User_3 can all hear each other. The conference call activation is completed.

Figure 18:
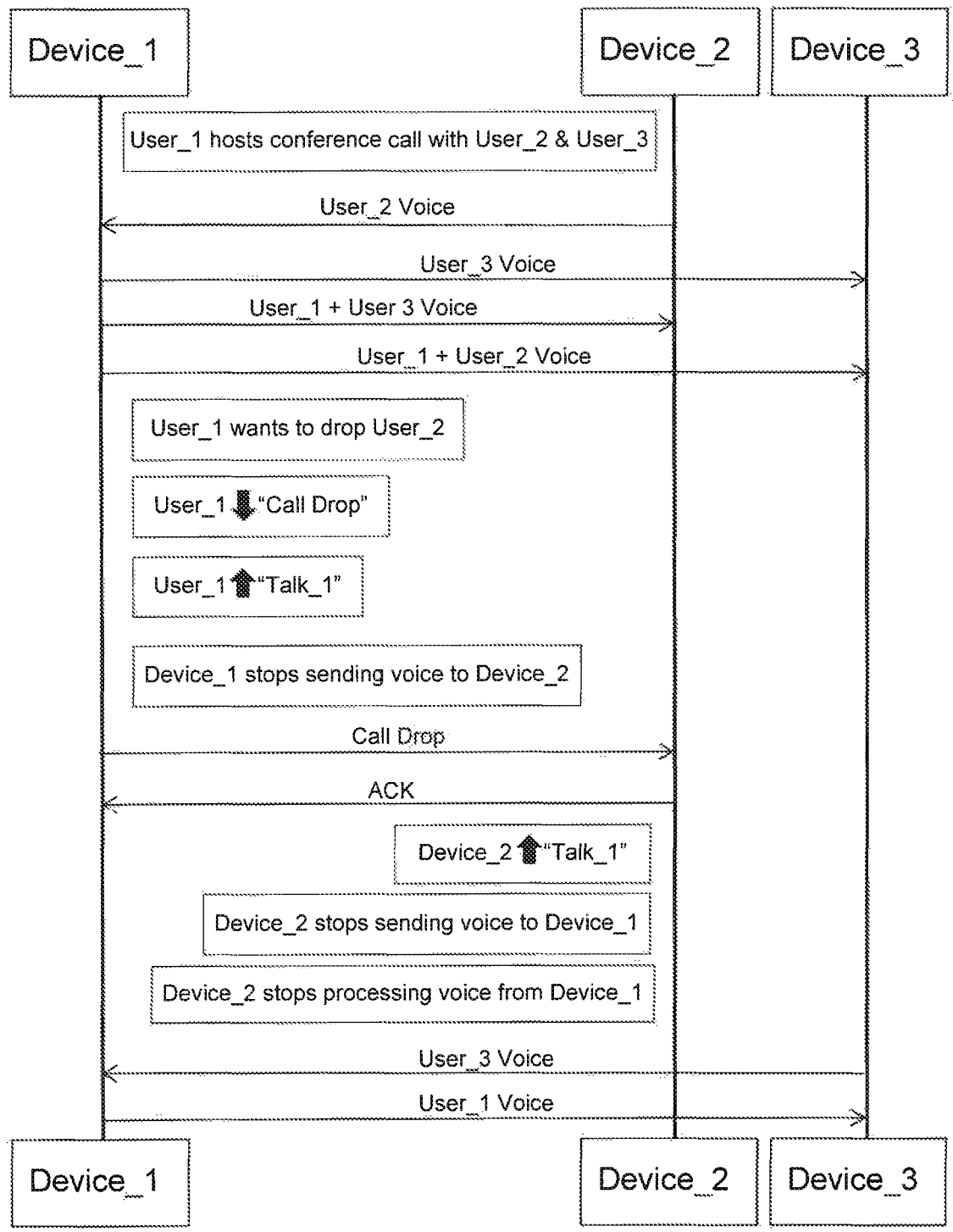
FIG. 18 illustrates an exemplary call flow for dropping a conference call participant by the host of the conference call according to aspects of this disclosure.

FIG. 18 illustrates an exemplary call flow for dropping a conference call participant by the host of the conference call according to aspects of this disclosure. In FIG. 18, User_1 is hosting a conference call with User_2 and User_3. User 1, User_2 and User_3 can all hear each other. Talk 1 and Talk 2 buttons on Device 1 are down. Talk 1 button on Device 2 and Talk 1 button on Device 3 are down.

In order to drop User_2 from the conference call, User_1 first presses the Call Drop Button, and then presses the Talk 1 button to release it. A sound alert for the Call Drop of Device_2 is played on the conference call so all parties can hear it. Device_1 stops sending any audio stream to Device_2. Device_1 also stops mixing User_2's voice. Additionally, Device_1 sends a Call Drop messages to Device_2. Device_2 acknowledges the receipt of the message. Device_2 automatically releases Talk_1 button, and Device_2 stops sending User_2's voice to Device 1. Additionally, Device_2 stops processing any audio stream from Device 1. Channel Light_1 on Device_1 and Device_2 turn green. Now User_2 is completely dropped off the conference call while the conference call continues on.

On Device 1, only Talk_2 is down. On Device_2, no button is down. On Device 3, only Talk_1 button is down. Device 1 and Device 3 can still talk with each other.

Figure 19:
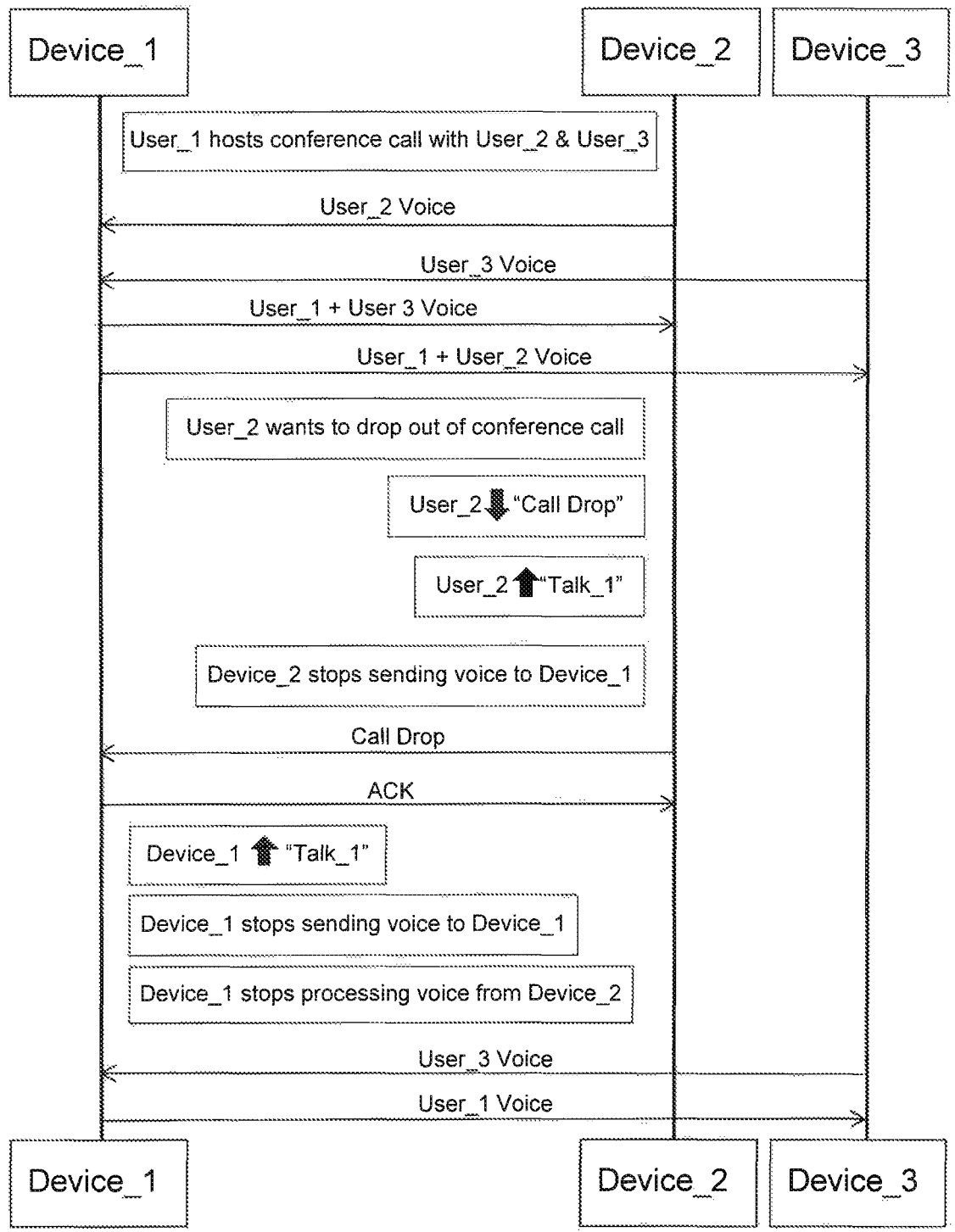
FIG. 19 illustrates an exemplary call flow for dropping a conference call by a participant of the conference call according to aspects of this disclosure.

FIG. 19 illustrates an exemplary call flow for dropping a conference call by a participant of the conference call according to aspects of this disclosure. In FIG. 19, User_1 is hosting a conference call with User_2 and User_3. User 1, User_2 and User_3 can all hear each other.

User_2 may or may not even know he is on a conference call. If he wants to drop out of the call, he first presses the Call Drop Button, and then presses the Talk_1 button to release it. Device_2 stops sending User_2's audio stream to Device 1. Additionally, Device_2 sends a Call Drop message to Device 1. Device_1 acknowledges the receipt of the message. Since Device_1 remembers the conference call structure, it knows that this user is a conference call participant. Device_1 automatically releases Talk_1 button, and Device_1 stops sending any audio stream to Device_2. Device_1 also stops mixing User_2's voice. A sound alert for the Call Drop is played on the conference call so everyone can hear it. Channel Light_1 on Device_1 and Device_2 turn green. User_2 is completely dropped off the conference call while the conference call continues on.

Figure 20A:
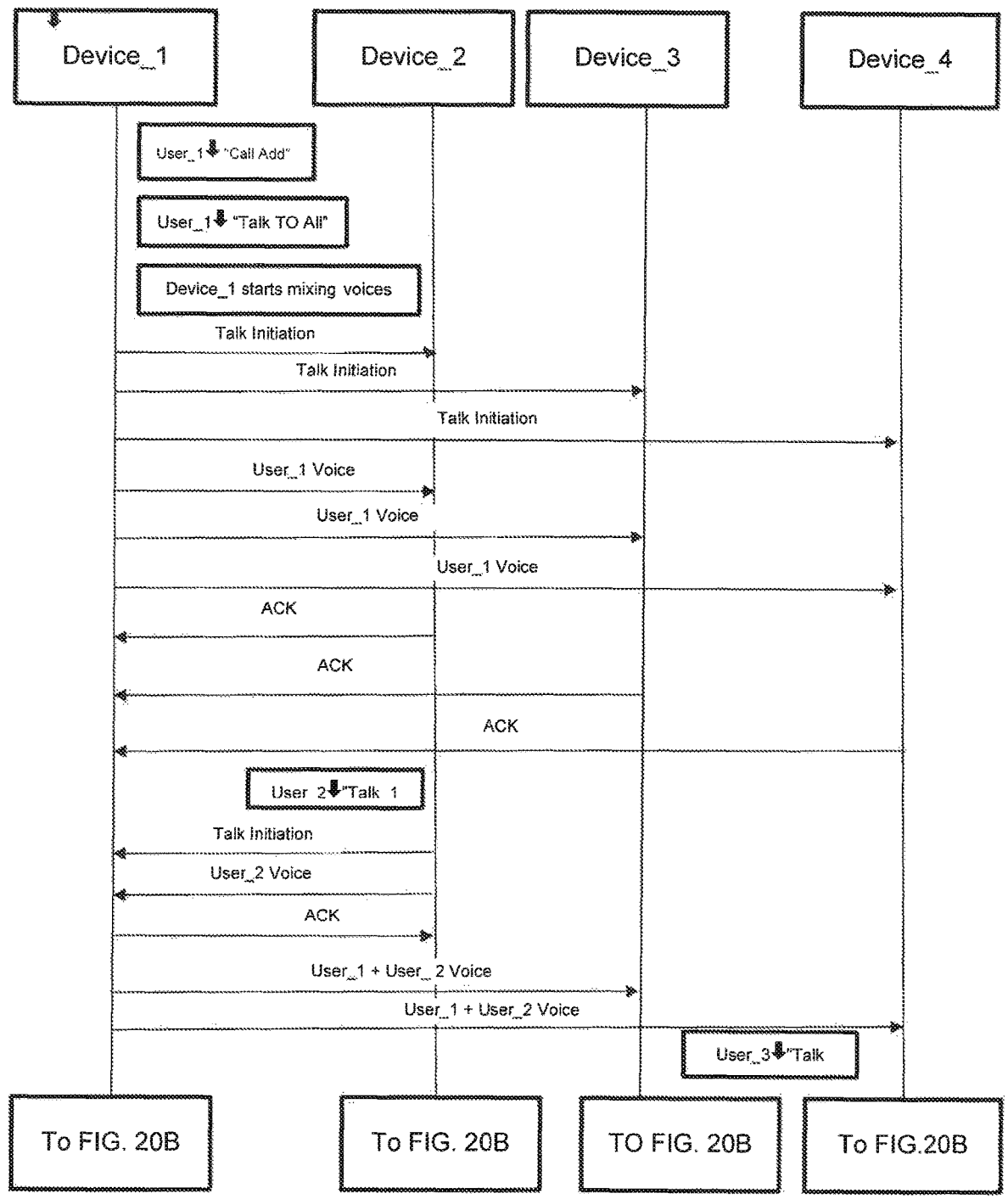
FIGS. 20A-20B illustrates an exemplary call flow for activating a conference call to all connected devices according to aspects of this disclosure.
Figure 20B:
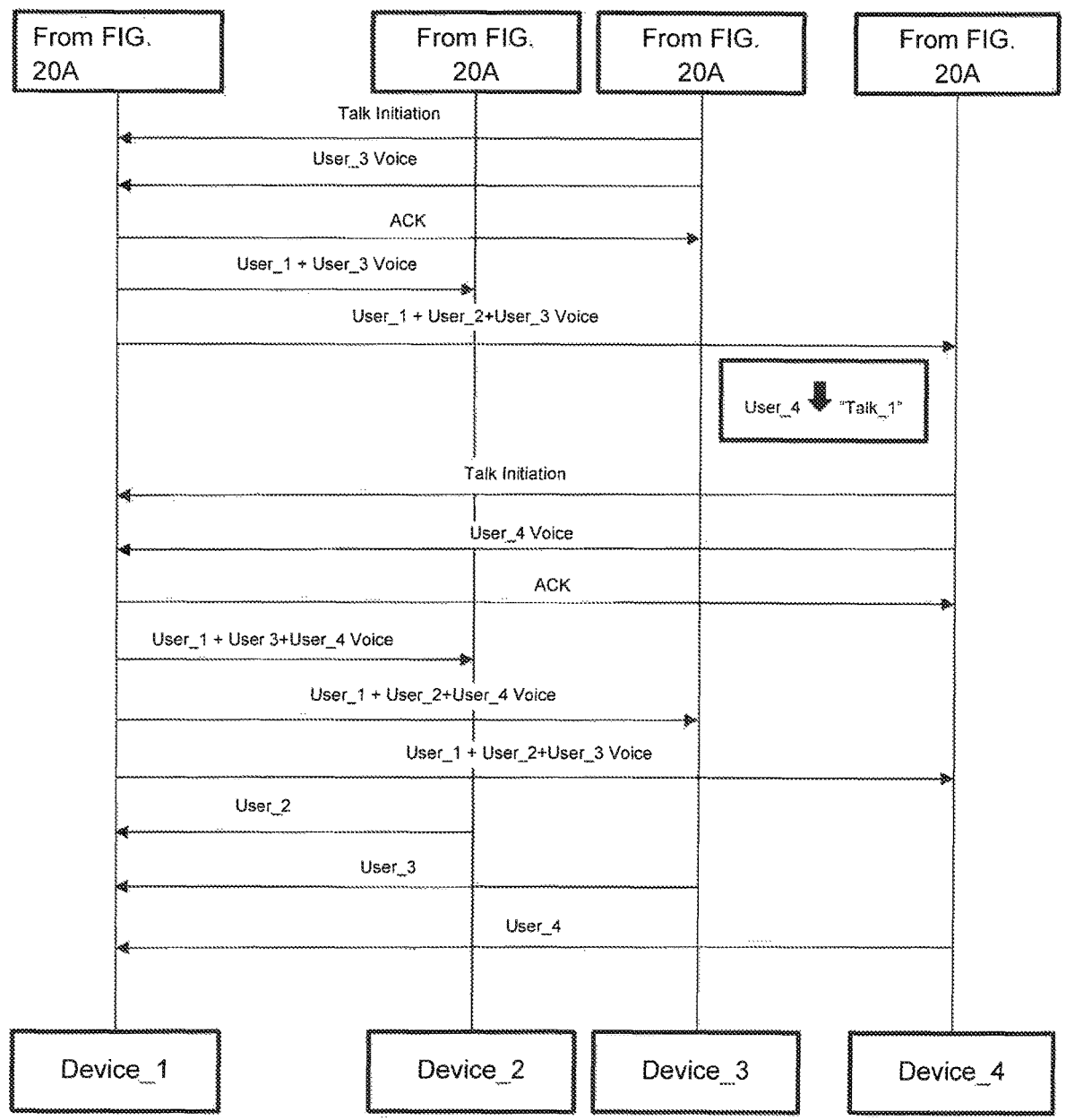

FIGS. 20A-20B illustrates an exemplary call flow for activating a conference call according to aspects of this disclosure. In FIG. 20A, User_1 first pushes the Call Add Button, then he presses the Talk to All Button 112. Since Talk to All on Device_1 corresponds to all the connected devices, Device_1 sends Talk Initiation messages to Device_2, Device_3 and Device_4. Device_1 starts sending User 1's voice in the form of IP packets to Device_2, Device_3 and Device_4. Device_2, Device_3 and Device_4 acknowledge the receipt of the messages. Device_2,_3 and_4 play a sound alert to indicate the incoming audio stream from User 1. Device_2, Device_3 and Device_4 receive User 1's audio stream and play User 1's voice on the speakers. Additionally, Channel Light_1 on Device_2, Device_3 and Device 4 flash red light to indicate the incoming audio stream from User_1 on Channel 1. Now User_2,_3 and_4 can hear User 1.

User_2 presses Talk_1 button. Device_2 sends a Talk Initiation message to Device 1. Device_2 starts sending User_2's voice in the form of IP packets to Device 1. Device_1 acknowledges the receipt of the message. Device_1 plays a sound alert on the conference call to indicate the incoming audio stream from User_2. Device_1 receives User_2's audio stream and plays User_2's voice on the speaker. Additionally, Channel Light_1 on Device_1 and Device_2 turn red. Now User_1 can hear User_2.

Referring to FIG. 20B, User_3 presses Talk_1 button. Device_3 sends a Talk Initiation message to Device 1. Device_3 starts sending User 3's voice in the form of IP packets to Device 1. Device_1 acknowledges the receipt of the message. Device_1 plays a sound alert on the conference call to indicate the incoming audio stream from User_3. Channel Light_2 on Device_1 and Channel Light_1 on Device_3 turn red. Device 1 receives User 3's audio stream. Note that Device 1 also receives User 2's voice. Device 1 mixes the voices of User_2 and User_3, and plays the mixed voices on the speaker. Now User_1 can hear both User_2 and User_3. Additionally, Device 1 mixes the voices of User 1 and User 2 and sends it to User 3. Device 1 also mixes the voices of User 1 and User 3 and sends it to User 2. Now User 2 and User 3 can hear each other.

User_4 presses Talk_1 button. Similarly, through the audio mixing by Device 1, User 1, User_2, User_3 and User_4 can hear each other.

Figure 21:
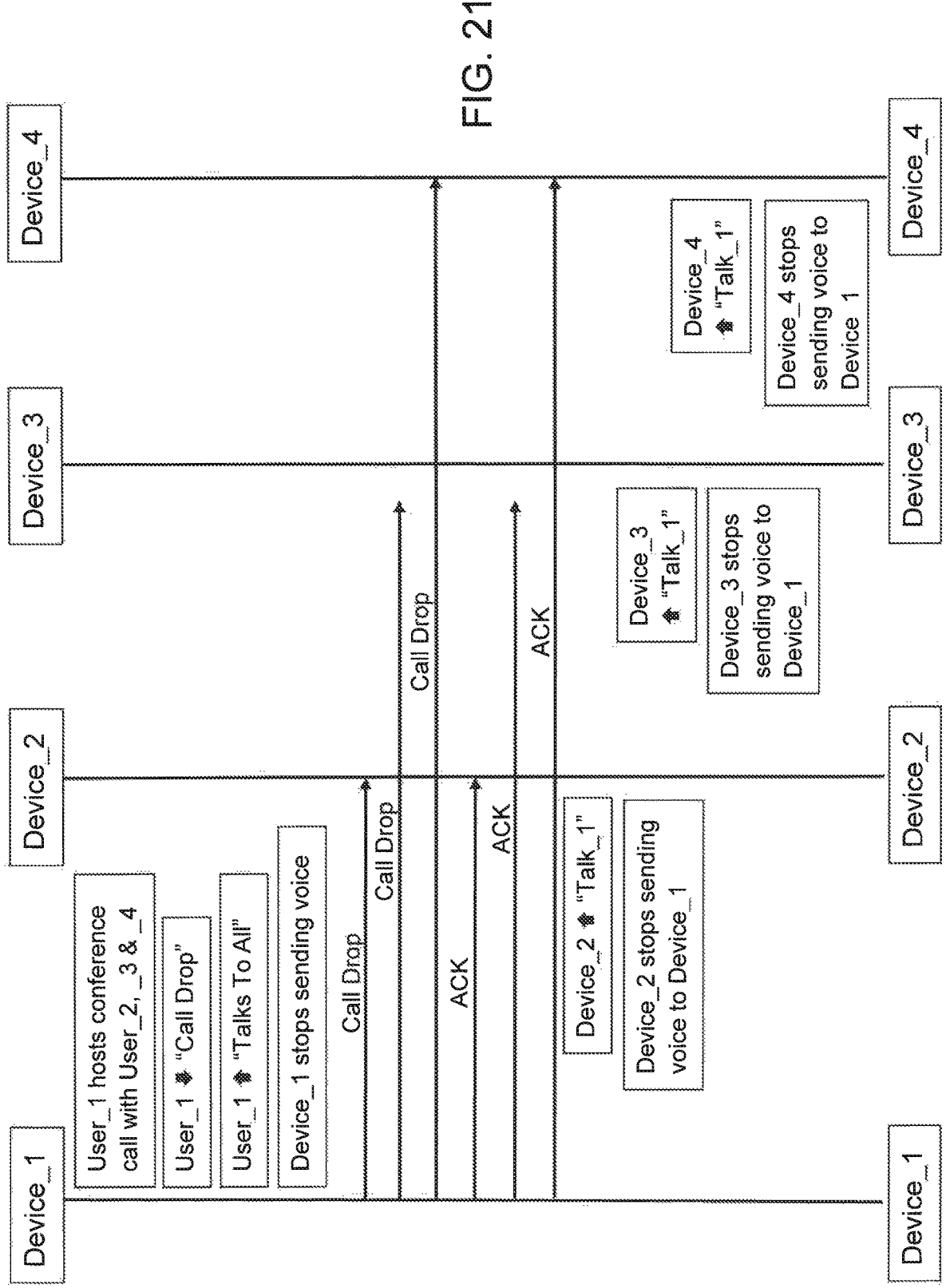
FIG. 21 illustrates an exemplary call flow for terminating a conference call to all connected devices according to aspects of this disclosure.

FIG. 21 illustrates an exemplary call flow for terminating a conference call according to aspects of this disclosure. In FIG. 21, User_1 is hosting a conference call with users of all the connected devices. In this case, all the connected devices are Device_2, Device_3 and Device 4. User 1, User_2, User_3 and User_4 can all hear each other. The Talk 1, Talk_2 and Talk_3 buttons and the Talk to All Button 112 on Device_1 are down. Talk_1 button on Device_2, Talk 1 button on Device 3 and Talk 1 button on Device 4 are down.

To terminate the conference call at once, User_1 first presses the Call Drop Button, and then presses the Talk to All Button 112 to release it. A sound alert is played on the conference call to indicate the dropping of a participant. Device_1 stops sending any audio stream to all connected devices. Device_1 also stops processing audio stream from any devices. Additionally, Device_1 sends a Call Drop message to all the connected devices. The connected devices acknowledge the receipt of the message. The connected devices automatically release the corresponding Talk Buttons respectively, and they stops sending its user's voice to Device 1. Additionally, the connected devices stop processing any audio stream from Device 1. Channel Light_1 on Device 1, Device 2, Device_3 and Device_4 turn green. Now the conference call is completely terminated at once.

Figure 22:
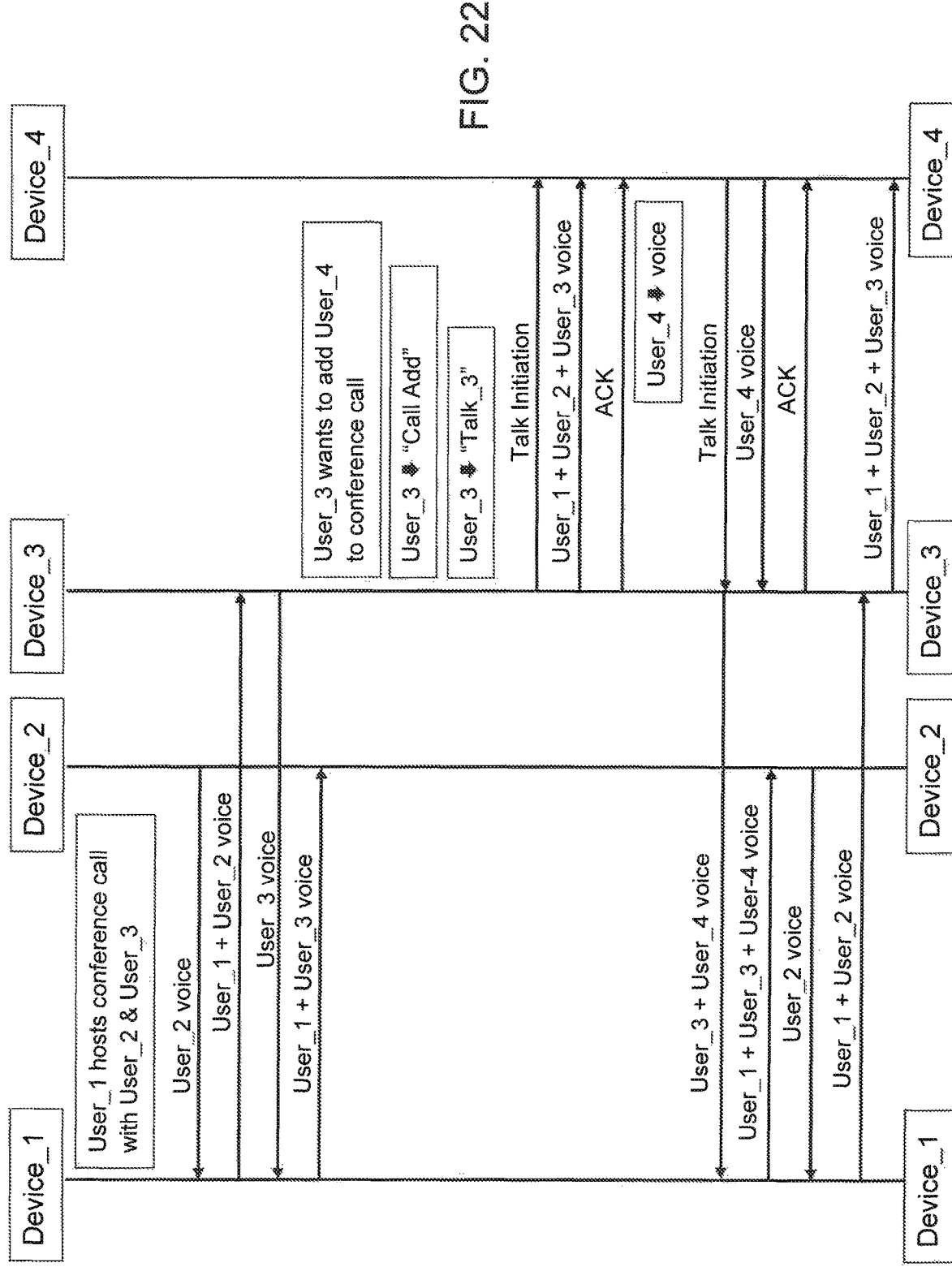
FIG. 22 illustrates an exemplary call flow for adding a participant to a conference call by a second host according to aspects of this disclosure.

FIG. 22 illustrates an exemplary call flow for adding a participant to a conference call by a second host according to aspects of this disclosure. In FIG. 22, User_1 is hosting a conference call with User_2 and User_3. User 1, User_2 and User_3 can all hear each other.

User_3 wants to add User_4 to the conference call. So User_3 presses the Call Add Button. Then User_3 presses Talk_3 button. Since Talk_3 on Device_3 corresponds to Device_4 as indicated by FIG. 6, Device_3 sends a Talk Initiation message to Device_4. Device_4 acknowledges the receipt of the message.

Since Device_3 is the second host of the conference call, it provides the audio mixing function for new participants that it adds to the conference call. In this case, the incoming audio stream from Device_1 contains the mixed voices of User 1 and User 2. Device 3 mixes the incoming voices from Device_1 with User 3's voice, producing the mixed voices of User 1, User_2 and User_3. Device_3 sends the mixed voices to User_4. Now User_4 can hear User 1, User_2 and User_3.

Device_4 plays a sound alert to indicate the incoming audio stream from User_3. Additionally, Channel Light_3 on Device_4 flashes red light to indicate the incoming audio stream from User_3 on Channel 3. Now User_4 presses Talk_3 button. Since Talk_3 on Device_4 corresponds to Device_3 as indicated by FIG. 6, Device_4 sends a Talk Initiation message to Device_3. Device_4 starts sending User_4's voice in the form of IP packets to Device_3. Device_3 acknowledges the receipt of the message. Device_3 receives User 4's voice. Note that Device 3 also receives the audio stream from Device 1. Device 3 mixes the voices from Device_1 with User_4's voice, and plays the mixed voices on the speaker. Now User_3 can hear User 1, User_2 and User_4.

Additionally, Device_3 mixes the voices of User_3 and User_4, and sends the mixed voices to Device 1. Note that Device 1 also receives User 2's voice. Device 1 mixes the incoming voice from Device_2 with the voices from Device_3, and plays the mixed voices on the speaker. Now User_1 can hear User_2, User_3 and User_4.

Device_1 mixes the audio stream from Device_3 with User 1's voice, and sends the mixed voices to Device_2. Device_2 receives the voices of User 1, User_3 and User_4. Now User_2 can hear User 1, User_3 and User_4.

Now User 1, User_2, User_3 and User_4 can all hear each other. The conference call is initiate initiated using two audio mixers: Device 1 and Device 3.

Figure 23:
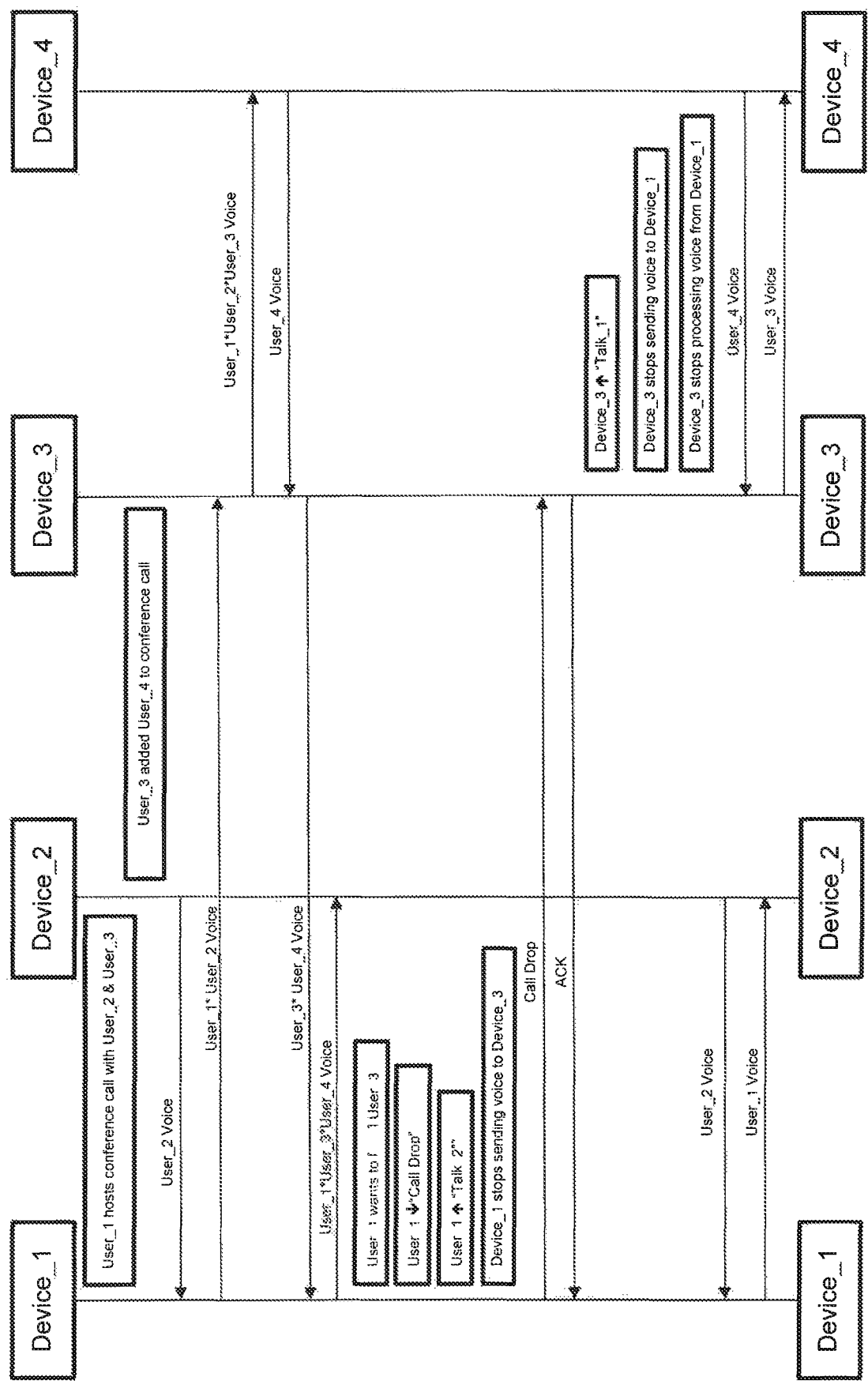
FIG. 23 illustrates an exemplary call flow for dropping a second host of a conference call by the host of the conference call according to aspects of this disclosure.

FIG. 23 illustrates an exemplary call flow for dropping a second host of a conference call by the host of the conference call according to aspects of this disclosure. In FIG. 23, User_1 is hosting a conference call with User_2 and User_3. User_3 acting as a second host, has added User_4 to the conference call. User 1, User_2, User_3 and User_4 can all hear each other.

User_1 wants to drop User_3 from the conference call. User_1 first presses the Call Drop button, and then releases the Talk_2 button by pressing on it again. Device_1 stops sending audio stream to Device_3. Additionally, Device_1 sends a Call Drop message to Device_3. Device_3 acknowledges the receipt of the message and stops processing the audio stream from Device 2. This audio stream contain the mixed voices of User 1 and User 2. Now User 3 can't hear User_1 or User_2. Additionally, Device_3 automatically releases the Talk_1 button, and Device_3 stops sending any audio stream to Device 1.

Now Device_1 and Device_2 can hear each other. Device 3 and Device 4 can hear each other.

5. Touch Screen Implementation of Instant Voice Device

Two ways of using the touch screen are described below:

The client device can be implemented via a software client installed on an existing device with touch screen. Such devices may have the necessary hardware to support the client software including the touch screen, Internet connectivity, microphone and speaker. Touch screen smartphones, e-book readers, and tablet computers typically are already equipped with the necessary hardware. The client software can be downloaded and installed on such a device. The client software runs as an application on such a device.

The client device is a physical device that is equipped with a touch screen. This device is specifically designed to be an Instant Voice Device.

Figure 24:
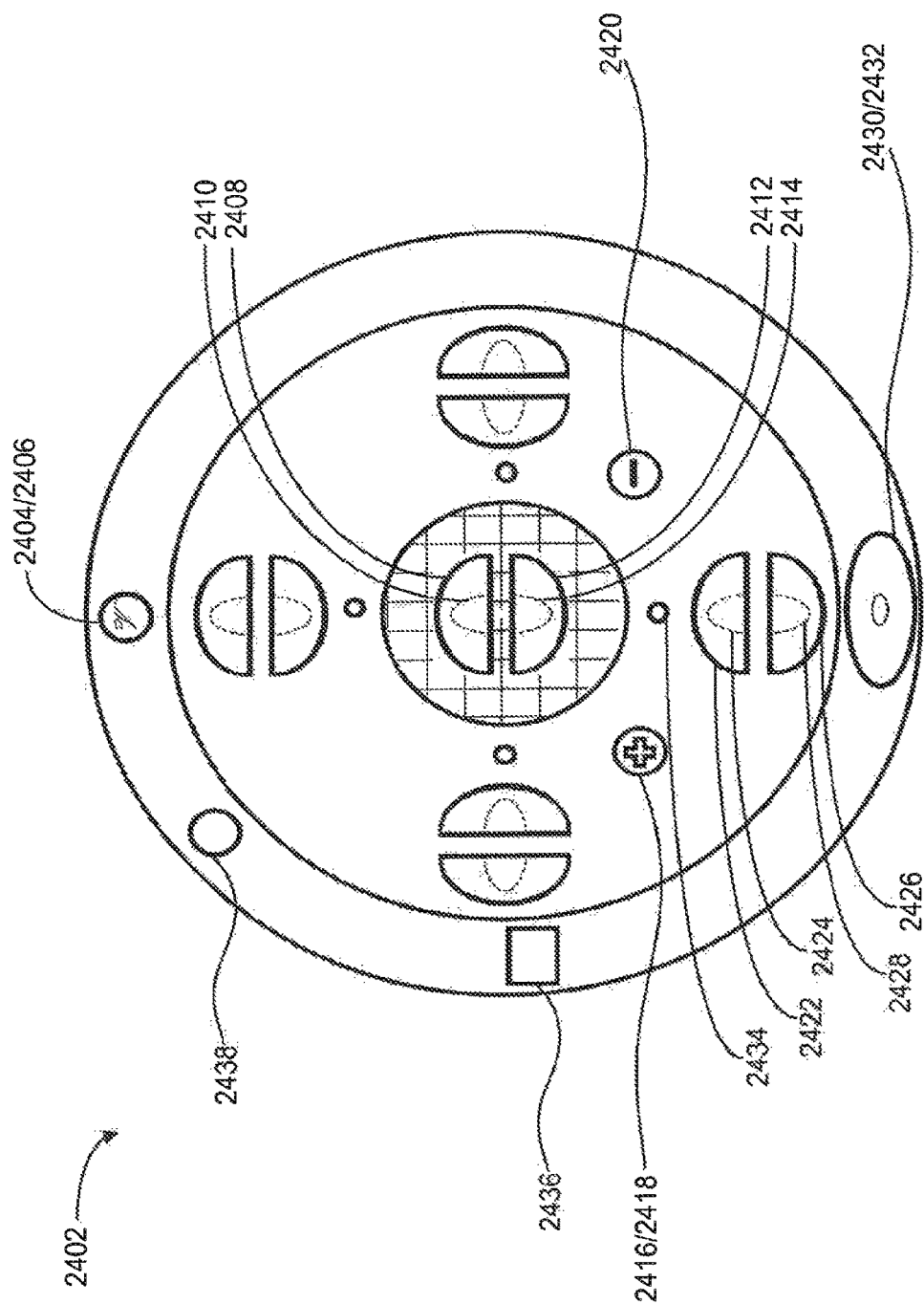
FIG. 24 illustrates an exemplary graphical user interface for a touch-screen embodiment of the communication device according to aspects of this disclosure.
Figure 25:
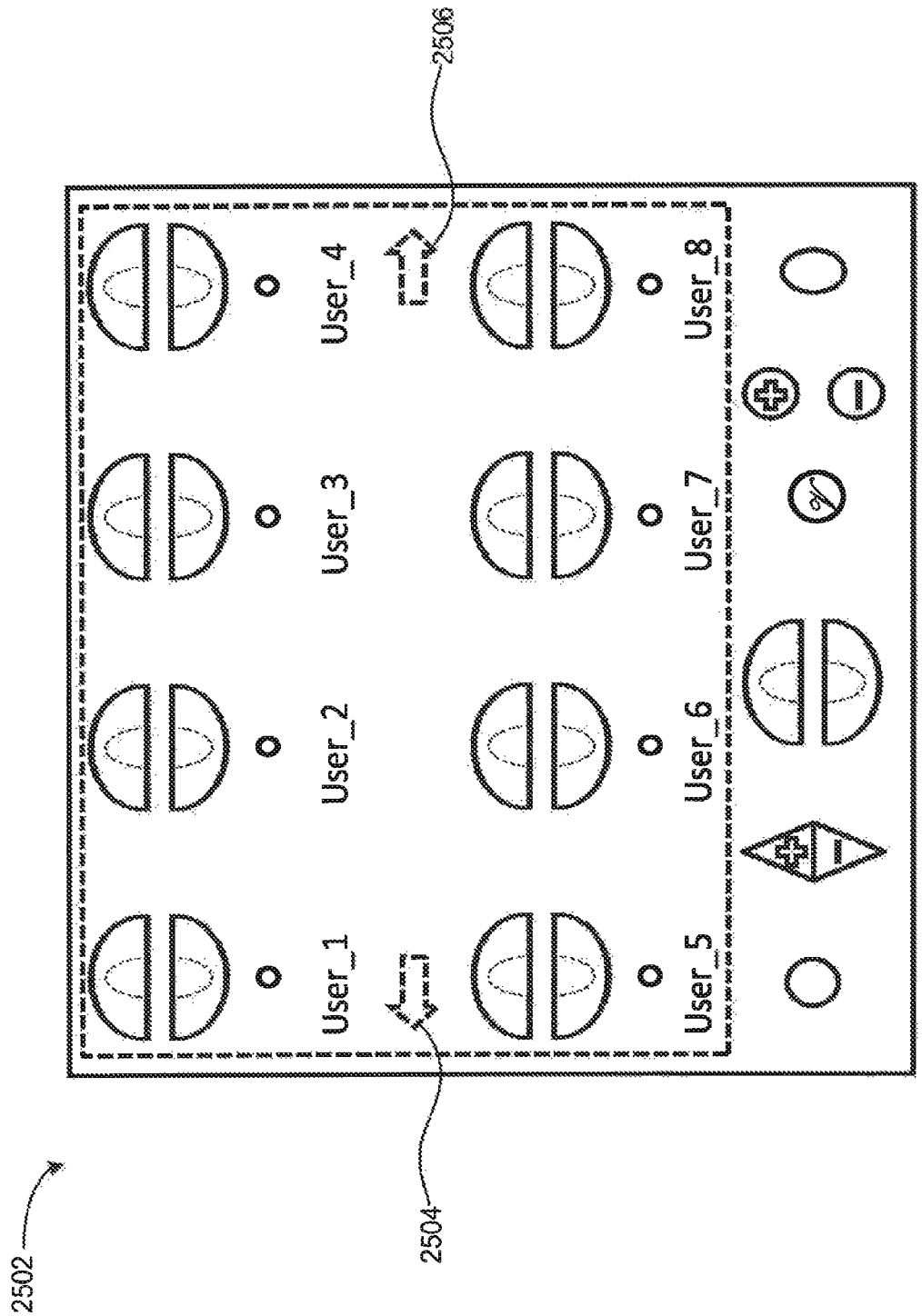
FIG. 25 illustrates another exemplary graphical user interface for a touch-screen embodiment of the communication device according to aspects of this disclosure

The Graphic User Interface (GUI) of the touch screen can have different layout. FIGS. 24-25 represent different layout of the GUIs.

In FIG. 24, a first GUI 2402 bears the resemblance of the physical device 102 as shown in FIG. 1, thus giving users the familiarity of the communication device 102 with physical buttons. In one embodiment, the first GUI design 2402 may include a Voicemail Button 2404 and a Voicemail Light 2406, a Talk to All Button 2408 and a Talk to All Light 2410, a Silence All Button 2412 and a Silence All Light 2414, a Call Add Button 2416 with a Call Add Light 2418, a Call Drop Button 2420, a Talk Button 2422 with a Talk Light 2424, a Silence Button 2426 and a Silence Light 2428, an Away Button 2430 with an Away Light 2432, a Channel Light 2434, an On/Off Button 2436, and a Connectivity Indicator 2438.

However, in order to support flexible number of channels, the GUI has to be modified.

In FIG. 25, a second GUI design 2502 allows for many more channels to be supported. The second GUI design 2502 may include one or more of the buttons of the first GUI design 2504. Moreover, a user may also use next 2504 and last page 2506 buttons to flip back and forth through multiple channels. The second GUI design 2502 may mimic the design of the physical device 102 to result in similar user experience.

The software clients may have full interoperability with the physical devices via the Internet Protocol (IP). In general, a physical communication device may have a hardware ID, but the client software does not. The client software can emulate a hardware ID by generating a software ID similar to the hardware ID that is unique among all hardware and software ID after the client software is first installed. The software ID identifies the specific installation of the client. The user can then configure the Device Name for the specific installation of the software client during configuration. The Device Name must be unique globally.

Configuration of a software client is similar to that of configuring a physical device. Data entry and display can now be done on the touch screen instead of using a configuration machine. Configuring connectivity of a software client probably isn't needed if an existing device is already configured to connect to the Internet. Through touch screen, a user can configure the Channel List.

Alternatively, the communication may be implemented via software on a computer without the touch screen. For instance, a software client may be installed a computer with a screen and a keyboard. In this case, the GUIs are similar to that of a touch screen. The operation of the GUI relies on the keyboard and the screen.

6. Applications

This system has broad applications in communications. A few applications are outlined below, but the system is not limited to these applications.

Baby Monitor

Put a device in the baby's room and press down the Talk to All Button 112. Put one or multiple devices in different rooms throughout the house. Now a parent can hear every sound in the baby's room throughout the rooms where such devices are placed.

Senior/Disabled/Sick Patient Monitor

Put a device in the room of a patient and press down the Talk to All Button 112. Put one or multiple devices in different rooms throughout the house. Now a care taker can hear every sound in the patient's room throughout the rooms where such devices are placed. If the care taker needs to speak to the patient, he can then press down the Talk Button 108 corresponding to the device of the patient. Now they can talk to each other.

Manager and Secretary

Put a device in the room of the secretary. Put a device in the room of the manager. When the manager wants something from the secretary, he presses down the Talk Button 108 to speak to the secretary. The secretary presses down the Talk Button 108 with a flashing red light and responds to the manager.

Intercom at Home

A large house may have many rooms, it might be tough to speak with family members who are in different rooms. Put a device in each of those rooms. A mom wants to call her children to sit down for dinner. She simply presses down the Talk to All Button 112 on the device in the kitchen and say "Time for dinner!". All her kids in their rooms can hear her and come to sit down for dinner. Alternatively, if the mom wants to speak with one of her children, she presses down the Talk Button 108 corresponding to the room of the child, and speaks to him.

Control Center

Put a device in the control center. Put a device in each of the workshops that are scattered throughout the factory. A control center manager can speak to people throughout the workshops at the same time. If the call is picked up by a workshop, the control center manager can switch to one-to-one communications with that workshop.

Work Group

A group of co-workers need to work late at night to finish a joint project. They are at home working on their own piece of the project, but need to have real time communications with each other from time to time over a period of several hours. The most effective way is for these co-workers to be on a conference call. One way to do this is for one of the co-workers to host a conference call with all the other co-workers. Once all the co-workers are on the conference call, then they can hear each other as if they were in a room together. The conference call can be left on for as long as needed. In this scenario, the co-workers might need to be in the listening mode most of the time while they work on their own piece. Every so often, a co-worker may need to speak with another co-worker. The mute feature of the instant conference call is quite useful. The users put themselves on mute. They can un-mute themselves, and speak to another person when needed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A first communication device for providing instantaneous communications, the first communication device comprising:
   a microphone that receives user voice inputs; and
   a processor configured to:
      establish a first communication channel associated with a media server, the first communication channel configured to support the transmission of one or more multimedia streams over an Internet Protocol (IP) network with the media server;
      output a first command based on a first voice input received from the microphone; and
      transmit the first command to the media server that instructs the media server to communicate with a second communication device and transmit over the Internet Protocol (IP) network a first outgoing multimedia stream to the second communication device using a second communication channel in response to the first command, the second communication channel configured to support the transmission of one or more multimedia streams over the Internet Protocol (IP) network between the media server and the second communication device associated with a second communication device identifier of a collection of communication device identifiers stored in the media server.

2. The first communication device of claim 1, wherein the first command further comprises timing information associated with the transmission of the first outgoing multimedia stream, wherein the media server starts the transmission of the first outgoing multimedia stream to the second communication device based on the timing information received.

3. The first communication device of claim 1, wherein the second communication device further comprises an indicator associated with the first communication channel, wherein the indicator is observed in a plurality of status states, each status state indicating a status of the first communication channel.

4. The first communication device of claim 3, wherein at least one status indicates a status associated with an incoming multimedia stream.

5. The first communication device of claim 1, wherein the processor is further configured to:
   output a second command based on a second voice input received from the microphone; and
   transmit the second command to the media server that instructs the media server to communicate with a plurality of communication devices and transmit over the Internet Protocol (IP) network multiple outgoing multimedia streams to a plurality of communication devices using a plurality of communications channels in response to the second command received from the first communication device, each respective outgoing multimedia stream being transmitted to each respective communication device, the plurality of communication channels configured to support transmitting one or more multimedia streams over the Internet Protocol (IP) network with the plurality of communication devices respectively, each communication device associated with each communication device identifier of the collection of communication device identifiers stored in the media server.

6. The first communication device of claim 5, wherein the second command further comprises timing information respectively associated with the transmission of the plurality of outgoing multimedia streams, and wherein the media server starts the transmission of the plurality of outgoing multimedia streams to the plurality of communication devices based on the respective timing information received.

7. A first communication device for providing instantaneous communications, the first communication device comprising:
   a microphone that receives user voice inputs; and
   a processor, configured to:
      establish a first communication channel associated with a media server, the first communication channel configured to support transmitting one or more multimedia streams over an Internet Protocol (IP) network with the media server;
      receive a first voice input from the microphone; and
      transmit the first voice input to the media server so that the media server processes the first voice input from the first communication device to output a first command for communicating with a second communication device and transmit over the Internet Protocol (IP) network a first outgoing multimedia stream to the second communication device using a second communication channel in response to the first command received from the first communication device, the second communication channel configured to support the transmission of one or more multimedia streams over the Internet Protocol (IP) network between the media server and the second communication device associated with a second communication device identifier of a collection of communication device identifiers stored in the media server.

8. The first communication device of claim 7, wherein the first command further comprises timing information associated with the transmission of the multimedia stream, and wherein the media server starts the transmission of the first outgoing multimedia stream to the second communication device based on the timing information received.

9. The first communication device of claim 7, wherein the first outgoing multimedia stream is multimedia content from the media server.

10. The first communication device of claim 7, wherein the processor is further configured to:
   receive a second voice input from the microphone; and
   transmit the second voice input to the media server so that the media server processes the second voice input from the first communication device to output a second command for bridging the communication between the first communication device and the second communication device, receive over the Internet Protocol (IP) network a first incoming multimedia stream from the first communication device using the first communication channel, forward over the Internet Protocol (IP) network the first incoming multimedia stream to the second communication device using the second communication channel, receive over the Internet Protocol (IP) network a second incoming multimedia stream from the second communication device using the second communication channel, and forward over the Internet Protocol (IP) network the second incoming multimedia stream to the first communication device using the first communication channel in response to the second command received from the first communication device.

11. The first communication device of claim 7, wherein the second communication device further comprising:
an indicator associated with the first communication channel, wherein the indicator is observed in a plurality of status states, each status state indicating a status of the first communication channel.

12. The first communication device of claim 11, wherein at least one status indicates a status associated with an incoming multimedia stream.

13. The first communication device of claim 7, wherein the processor is further configured to:
receive a second voice input from the microphone; and
transmit the second voice input to the media server so that the media server processes the second voice input from the first communication device to output a second command for communicating with a plurality of communication devices, and transmits over the Internet Protocol (IP) network multiple outgoing multimedia streams to a plurality of communication devices using a plurality of communications channels in response to the second command, each respective outgoing multimedia stream being transmitted to each respective communication device, the plurality of communication channels configured to support transmitting one or more multimedia streams over the Internet Protocol (IP) network with the plurality of communication devices respectively, each communication device associated with each communication device identifier of the collection of communication device identifiers stored in the media server.

14. The first communication device of claim 13, wherein the second command further comprises timing information respectively associated with the transmission of the plurality of outgoing multimedia streams, and wherein the media server starts the transmission of the plurality of outgoing multimedia streams to the plurality of communication devices based on the timing information received.

15. The first communication device of claim 7, wherein the processor is further configured to:
receive a second voice input from the microphone; and
transmit the second voice input to the media server so that the media server processes the second voice input from the first communication device to output a second command for bridging the communication with a plurality of communication devices, receives over the Internet Protocol (IP) network a plurality of incoming audio streams from the plurality of communication devices, mixes all incoming audio streams except for the audio stream from a destination communication device of the plurality of communication devices to output a mixed audio stream, and transmits over the Internet Protocol (IP) network the mixed audio stream to the destination communication device using a preconfigured communication channel in response to the second command received from the first communication device, each respective incoming audio stream being received from each respective communication device, the plurality of communication channels configured to support transmitting one or more multimedia streams over the Internet Protocol (IP) network with the plurality of communication devices respectively, each communication device associated with each communication device identifier of the collection of communication device identifiers stored in the media server.

16. A method for providing instantaneous communications, the method comprising:
storing, by a media server, a collection of communication device identifiers, each respective communication device identifier corresponding to each communication devices;
establishing, by the media server, a second communication channel associated with a second communication device, the second communication channel configured to support the transmission of one or more multimedia streams over an Internet Protocol (IP) network with the second communication device associated with a second communication device identifier of the collection of communication device identifiers stored in the media server;
receiving and processing, by the media server, a first voice input from a first communication device for communicating with a second communication device; and
transmitting, by the media server, over the Internet Protocol (IP) network a first outgoing multimedia stream to the second communication device using a first communication channel in response to a first command based on the first voice input received from the first communication device.

17. The method of claim 16, wherein the first command further comprises timing information associated with the transmission of the first outgoing multimedia stream, wherein the media server starts the transmission of the first outgoing multimedia stream to the second communication device based on the timing information received.

18. The method of claim 16, further comprising:
establishing, by the media server, a plurality of communication channels respectively associated with a plurality of communication devices, the plurality of communication channels configured to support transmitting one or more multimedia streams over the Internet Protocol (IP) network with the plurality of communication devices respectively associated with the plurality of communication device identifiers stored in the media server;
receiving and processing, by the media server, a second command based on a second voice input from the first communication device for communicating with the plurality of communication devices through the media server; and
transmitting, by the media server, over the Internet Protocol (IP) network a plurality of outgoing multimedia streams to the plurality of communication devices, each respective outgoing multimedia stream being transmitted to each respective communication device in response to the second command received from the first communication device.

19. The method of claim 16, wherein the first outgoing multimedia stream is multimedia content from the media server.

20. The method of claim 16, wherein the first outgoing multimedia stream is a real-time multimedia stream from the first communication device.

\* \* \* \* \*